United States Patent
Klessig et al.

(10) Patent No.: US 8,667,095 B2
(45) Date of Patent: *Mar. 4, 2014

(54) LOCAL AUTO-CONFIGURATION OF NETWORK DEVICES CONNECTED TO MULTIPOINT VIRTUAL CONNECTIONS

(75) Inventors: Robert W. Klessig, Los Altos Hills, CA (US); Cedric H. Druce, Basking Ridge, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1187 days.

This patent is subject to a terminal disclaimer.

(21) Appl. No.: 11/937,779

(22) Filed: Nov. 9, 2007

(65) Prior Publication Data

US 2009/0125617 A1  May 14, 2009

(51) Int. Cl.
*G06F 15/177* (2006.01)
(52) U.S. Cl.
USPC ........... 709/220; 370/238; 370/239; 370/255; 370/396; 370/400; 370/401; 370/402
(58) Field of Classification Search
None
See application file for complete search history.

(56) References Cited

U.S. PATENT DOCUMENTS

| | | | | |
|---|---|---|---|---|
| 5,502,816 A | * | 3/1996 | Gawlick et al. | 709/227 |
| 5,812,552 A | | 9/1998 | Arora et al. | 370/395.53 |
| 5,930,259 A | * | 7/1999 | Katsube et al. | 370/409 |
| 6,011,782 A | * | 1/2000 | DeSimone et al. | 370/260 |
| 6,061,334 A | | 5/2000 | Berlovitch et al. | |
| 6,314,103 B1 | * | 11/2001 | Medhat et al. | 370/395.2 |
| 6,400,730 B1 | * | 6/2002 | Latif et al. | 370/466 |
| 6,490,622 B1 | * | 12/2002 | Nagami et al. | 709/225 |
| 6,631,134 B1 | * | 10/2003 | Zadikian et al. | 370/395.21 |
| 6,697,338 B1 | * | 2/2004 | Breitbart et al. | 370/254 |
| 6,757,286 B1 | * | 6/2004 | Stone | 370/395.53 |
| 6,765,914 B1 | * | 7/2004 | Jain et al. | 370/395.31 |
| 6,801,498 B1 | * | 10/2004 | Kamiya | 370/225 |
| 7,039,008 B1 | * | 5/2006 | Howes et al. | 370/220 |
| 7,310,342 B2 | * | 12/2007 | Rouleau | 370/397 |
| 7,366,188 B2 | * | 4/2008 | Kim | 370/401 |
| 7,400,590 B1 | | 7/2008 | Rygh et al. | |
| 7,444,415 B1 | * | 10/2008 | Bazzinotti et al. | 709/229 |
| 7,522,520 B2 | * | 4/2009 | Griggs | 370/230 |
| 7,523,185 B1 | * | 4/2009 | Ng et al. | 709/223 |
| 7,664,056 B2 | * | 2/2010 | Dye et al. | 370/260 |
| 2002/0051456 A1 | * | 5/2002 | Kinnunen | 370/397 |
| 2002/0078379 A1 | * | 6/2002 | Edwards et al. | 713/201 |
| 2002/0176450 A1 | * | 11/2002 | Kong et al. | 370/539 |

(Continued)

OTHER PUBLICATIONS

T. Bradley and C. Brown, "Inverse Address Resolution Protocol," RFC 1293, Wellfleet Communications, Inc., Jan. 1992, pp. 1-6, ftp://ftp.rfc-editor.org/in-notes/rfc1293.txt.

(Continued)

*Primary Examiner* — Ian N Moore
*Assistant Examiner* — Dung B Huynh
(74) *Attorney, Agent, or Firm* — Campbell Stephenson LLP

(57) ABSTRACT

Various systems and methods for automatically configuring network devices coupled to a network that provides (or is capable of providing) multipoint virtual connections are disclosed. One such method involves receiving information identifying a plurality of virtual connections (VCs) available within a network. The method identifies a set of one or more nodes that are configured with one of several Internet Protocol (IP) subnets and that have access to one of the VCs, and then assigns each of the IP subnets to a unique one of the VCs.

15 Claims, 12 Drawing Sheets

(56) References Cited

U.S. PATENT DOCUMENTS

| | | | |
|---|---|---|---|
| 2003/0055968 A1* | 3/2003 | Hochmuth et al. | 709/226 |
| 2003/0069958 A1* | 4/2003 | Jalava | 709/223 |
| 2003/0152038 A1* | 8/2003 | Oshima et al. | 370/252 |
| 2003/0154307 A1* | 8/2003 | Puthiyandyil et al. | 709/245 |
| 2004/0059828 A1* | 3/2004 | Hooper et al. | 709/238 |
| 2004/0081158 A1* | 4/2004 | Moll et al. | 370/395.1 |
| 2004/0223464 A1* | 11/2004 | Dye et al. | 370/260 |
| 2004/0255028 A1* | 12/2004 | Chu et al. | 709/227 |
| 2004/0264388 A1* | 12/2004 | Rover et al. | 370/254 |
| 2005/0003827 A1* | 1/2005 | Whelan | 455/454 |
| 2005/0117588 A1* | 6/2005 | Tseng et al. | 370/395.31 |
| 2005/0135234 A1* | 6/2005 | Saleh et al. | 370/218 |
| 2005/0169279 A1 | 8/2005 | Magd et al. | 370/395.5 |
| 2007/0041329 A1* | 2/2007 | Schine | 370/250 |
| 2007/0081530 A1* | 4/2007 | Nomura et al. | 370/389 |
| 2007/0180109 A1* | 8/2007 | Brim | 709/225 |
| 2008/0005398 A1* | 1/2008 | Huffman | 710/39 |
| 2008/0034077 A1* | 2/2008 | Takashige et al. | 709/223 |
| 2008/0134315 A1* | 6/2008 | Tamura et al. | 726/12 |
| 2008/0313305 A1* | 12/2008 | Long | 709/217 |

OTHER PUBLICATIONS

Metro Ethernet Forum, "Technical Specification MDF 16, Ethernet Local Management Interface (E-LMI)," Jan. 2006, ©The Metro Ethernet Forum 2006, 40 pages.

Robert W. Klessig and Cedric H. Druce, pending U.S. Patent Application entitled, "Global Auto-Configuration of Network Devices Connected to Multipoint Virtual Connections," U.S. Appl. No. 11/937,819, filed Nov. 9, 2007, including Specification: pp. 1-41 and Drawings: 16 sheets.

Klessig et al., Pending U.S. Patent Application entitled, "Ethernet Local Management Interface (E-LMI)," U.S. Appl. No. 10/811,458, filed Mar. 26, 2004, including Specification: 59 pages and Drawings: 10 sheets.

* cited by examiner

| ND1 | EVC1 | EVC2 | EVC4 |
|---|---|---|---|
| S1 | ND1, ND4 | ND1 | ND1, ND4 |
| S2 | ND1, ND2, ND3, ND4 | ND1, ND2, ND3 | ND1, ND2, ND3, ND4 |
| S3 | ND1, ND2, ND3 | ND1, ND2, ND3 | ND1, ND2, ND3 |

*FIG. 4A*

| ND2 | EVC1 | EVC2 | EVC3 | EVC4 |
|---|---|---|---|---|
| S2 | ND1, ND2, ND3, ND4 | ND1, ND2, ND3 | ND2, ND3, ND4 | ND1, ND2, ND3, ND4 |
| S3 | ND1, ND2, ND3 | ND1, ND2, ND3 | ND2, ND3 | ND1, ND2, ND3 |

*FIG. 4B*

| ND3 | EVC1 | EVC2 | EVC3 | EVC4 |
|---|---|---|---|---|
| S2 | ND1, ND2, ND3, ND4 | ND1, ND2, ND3 | ND2, ND3, ND4 | ND1, ND2, ND3, ND4 |
| S3 | ND1, ND2, ND3 | ND1, ND2, ND3 | ND2, ND3 | ND1, ND2, ND3 |
| S4 | ND3, ND4 | ND3 | ND3, ND4 | ND3, ND4 |

*FIG. 4C*

| ND4 | EVC1 | EVC3 | EVC4 |
|---|---|---|---|
| S1 | ND1, ND4 | ND4 | ND1, ND4 |
| S2 | ND1, ND2, ND3, ND4 | ND2, ND3, ND4 | ND1, ND2, ND3, ND4 |
| S4 | ND3, ND4 | ND3, ND4 | ND3, ND4 |

*FIG. 4D*

| ND1 | EVC1 | EVC2 | EVC4 | S Entropy |
|---|---|---|---|---|
| S1 | 1 | 0 | 1 | 2 |
| S2 | 1 | 0 | 1 | 2 |
| S3 | 1 | 1 | 1 | 3 |

*FIG. 5A*

| ND2 | EVC1 | EVC2 | EVC3 | EVC4 | S Entropy |
|---|---|---|---|---|---|
| S2 | 1 | 0 | 0 | 1 | 2 |
| S3 | 1 | 1 | 0 | 1 | 3 |

*FIG. 5B*

| ND3 | EVC1 | EVC2 | EVC3. | EVC4 | S Entropy |
|---|---|---|---|---|---|
| S2 | 1 | 0 | 0 | 1 | 2 |
| S3 | 1 | 1 | 0 | 1 | 3 |
| S4 | 1 | 0 | 1 | 1 | 3 |

*FIG. 5C*

| ND4 | EVC1 | EVC3 | EVC4 | S Entropy |
|---|---|---|---|---|
| S1 | 1 | 0 | 1 | 2 |
| S2 | 1 | 0 | 1 | 2 |
| S4 | 1 | 1 | 1 | 3 |

*FIG. 5D*

|  | Transmits | | | | Receives | | | |
|---|---|---|---|---|---|---|---|---|
|  | EVC1 | EVC2 | EVC3 | EVC4 | EVC1 | EVC2 | EVC3 | EVC4 |
| ND1 | S1, S2, S3 | S3 |  | S1, S2, S3 | S1, S2, S3, S4 | S3 |  | S1, S2, S3, S4 |
| ND2 | S2, S3 | S3 |  | S2, S3 | S1, S2, S3, S4 | S3 | S4 | S1, S2, S3, S4 |
| ND3 | S2, S3, S4 | S3 | S4 | S2, S3, S4 | S1, S2, S3, S4 | S3 | S4 | S1, S2, S3, S4 |
| ND4 | S1, S2, S4 |  | S4 | S1, S2, S4 | S1, S2, S3, S4 |  | S4 | S1, S2, S3, S4 |

*FIG. 6*

| ND1 | EVC1 | EVC2 | EVC4 | S Entropy |
|---|---|---|---|---|
| S1 | 1 | 0 | 1 | 2 |
| S2 | 1 | 0 | 1 | 2 |
| S3 | 1 | 1 | 1 | 3 |
| S4* | 1 | 0 | 1 | |
| E Entropy | 4 | 1 | 4 | |

*FIG. 7A*

| ND2 | EVC1 | EVC2 | EVC3 | EVC4 | S Entropy |
|---|---|---|---|---|---|
| S1* | 1 | 0 | 0 | 1 | |
| S2 | 1 | 0 | 0 | 1 | 2 |
| S3 | 1 | 1 | 0 | 1 | 3 |
| S4* | 1 | 0 | 1 | 1 | |
| E Entropy | 4 | 1 | 1 | 4 | |

*FIG. 7B*

| ND3 | EVC1 | EVC2 | EVC3 | EVC4 | S Entropy |
|---|---|---|---|---|---|
| S1* | 1 | 0 | 0 | 1 | |
| S2 | 1 | 0 | 0 | 1 | 2 |
| S3 | 1 | 1 | 0 | 1 | 3 |
| S4 | 1 | 0 | 1 | 1 | 3 |
| E Entropy | 4 | 1 | 1 | 4 | |

*FIG. 7C*

| ND4 | EVC1 | EVC3 | EVC4 | S Entropy |
|---|---|---|---|---|
| S1 | 1 | 0 | 1 | 2 |
| S2 | 1 | 0 | 1 | 2 |
| S3* | 1 | 0 | 1 | |
| S4 | 1 | 1 | 1 | 3 |
| E Entropy | 4 | 1 | 4 | |

*FIG. 7D*

|  | Transmits | | | | Receives | | | |
|---|---|---|---|---|---|---|---|---|
|  | EVC1 | EVC2 | EVC3 | EVC4 | EVC1 | EVC2 | EVC3 | EVC4 |
| ND1 | S1(2) |  |  |  | S1(2), S2(2) |  |  |  |
| ND2 | S2(2) |  |  |  | S1(2), S2(2) |  |  |  |
| ND3 | S2(2) |  |  |  | S1(2), S2(2) |  |  |  |
| ND4 | S1(2) |  |  |  | S1(2), S2(2) |  |  |  |

FIG. 8

LOCAL AUTO-CONFIGURATION OF NETWORK DEVICES CONNECTED TO MULTIPOINT VIRTUAL CONNECTIONS

FIELD OF THE INVENTION

This invention relates to networking and, more particularly, to performing auto-configuration in networks, such as Metro Ethernet Networks, that provide virtual connections (i.e., connections that do not necessarily have a one-to-one correspondence with the actual underlying physical connections) among multiple endpoints.

BACKGROUND

Service Providers (SPs) use Wide Area Networks (WANs) and Metropolitan Area Networks (MANs) to provide customers with connectivity to the Internet and/or with connectivity to geographically diverse customer locations. Historically, WANs and MANs have been implemented using Synchronous Optical Networks (SONET), Frame Relay, or Asynchronous Transfer Mode (ATM) technologies. Recently, however, Service Providers have begun to use Ethernet technology to implement WANs and MANs. Such implementations use Ethernet as the frame format to connect the subscriber's equipment, called a Customer Edge (CE) device, to the network. Alternatively, such implementations can involve encapsulating an Ethernet frame according to one of several other protocols (or vice versa) to achieve the transfer of the Ethernet frame from the CE device to the Service Provider's network. The point of demarcation between the CE device and the Service Provider's network is referred to as the User-to-Network Interface (UNI).

Ethernet Virtual Connections (EVCs) provide the fundamental connectivity mechanism for Ethernet-based MAN and WAN service. An EVC associates a group of UNIs. The UNIs coupled by the same EVC form a closed user group, such that Ethernet frames entering the EVC at one UNI can only exit the network at another UNI that is associated with the same EVC.

EVCs can be point-to-point, multipoint-to-multipoint, or rooted-multipoint. Point-to-point EVCs couple exactly two UNIs. Multipoint-to-multipoint EVCs can associate more than two UNIs. When a multipoint EVC is used, a single Ethernet frame that enters the multipoint EVC at one UNI can be replicated within the Service Provider network, such that copies of that Ethernet frame exit the network at multiple other UNIs (e.g., if multicast transmission is desired) or at all of the other UNIs (e.g., if broadcast transmission is desired) associated by that EVC. A rooted-multipoint EVC designates each UNI coupled by that rooted-multipoint EVC as either a root or a leaf. Traffic entering an EVC at a root UNI can be sent to any or all of the other UNIs associated by the EVC; however, traffic entering an EVC at a leaf UNI can only be sent to root UNIs associated by the EVC.

A customer wishing to create a topology using an Ethernet-based WAN or MAN can connect a device such as an Internet Protocol (IP) router at each of a number of UNIs and associate an IP subnet with each of the available EVCs. In such a situation, control and provisioning of EVCs in the network are under the administrative control of the Service Provider (SP), while the configuration of the router is under the customer's administrative control. This split in administrative domains can lead to a number of challenges. At the most practical level, the split requires the SP and customer to coordinate their efforts and (even if attempts are made to coordinate) a number of potential problems, including misconfigurations, confusion about when service will become active, and the like, may arise. To reduce the likelihood of these problems, it is desirable to decouple, as much as is possible, the configuration tasks of the SP from the configuration tasks of the customer.

BRIEF DESCRIPTION OF THE DRAWINGS

A more complete understanding of the present invention may be acquired by referring to the following description and the accompanying drawings, in which like reference numbers indicate like features.

FIGS. 4A-4D each illustrates a subnet-to-EVC incidence (SEI) table generated by a respective one of the four nodes of FIG. 2, according to one embodiment of the present invention.

FIGS. 5A-5D each illustrates a maximal SEI (MSEI) table generated by a respective one of the four nodes of FIG. 2, according to one embodiment of the present invention.

FIG. 6 illustrates collision indication vectors (CIVs) that are sent and received by each of the four nodes of FIG. 2, according to one embodiment of the present invention.

FIGS. 7A-7D each illustrates an expanded MSEI table generated by a respective one of the four nodes of FIG. 2, according to one embodiment of the present invention.

FIG. 8 illustrates information that can be exchanged prior to assigning an IP subnet to an EVC, according to one embodiment of the present invention.

Figure 1:
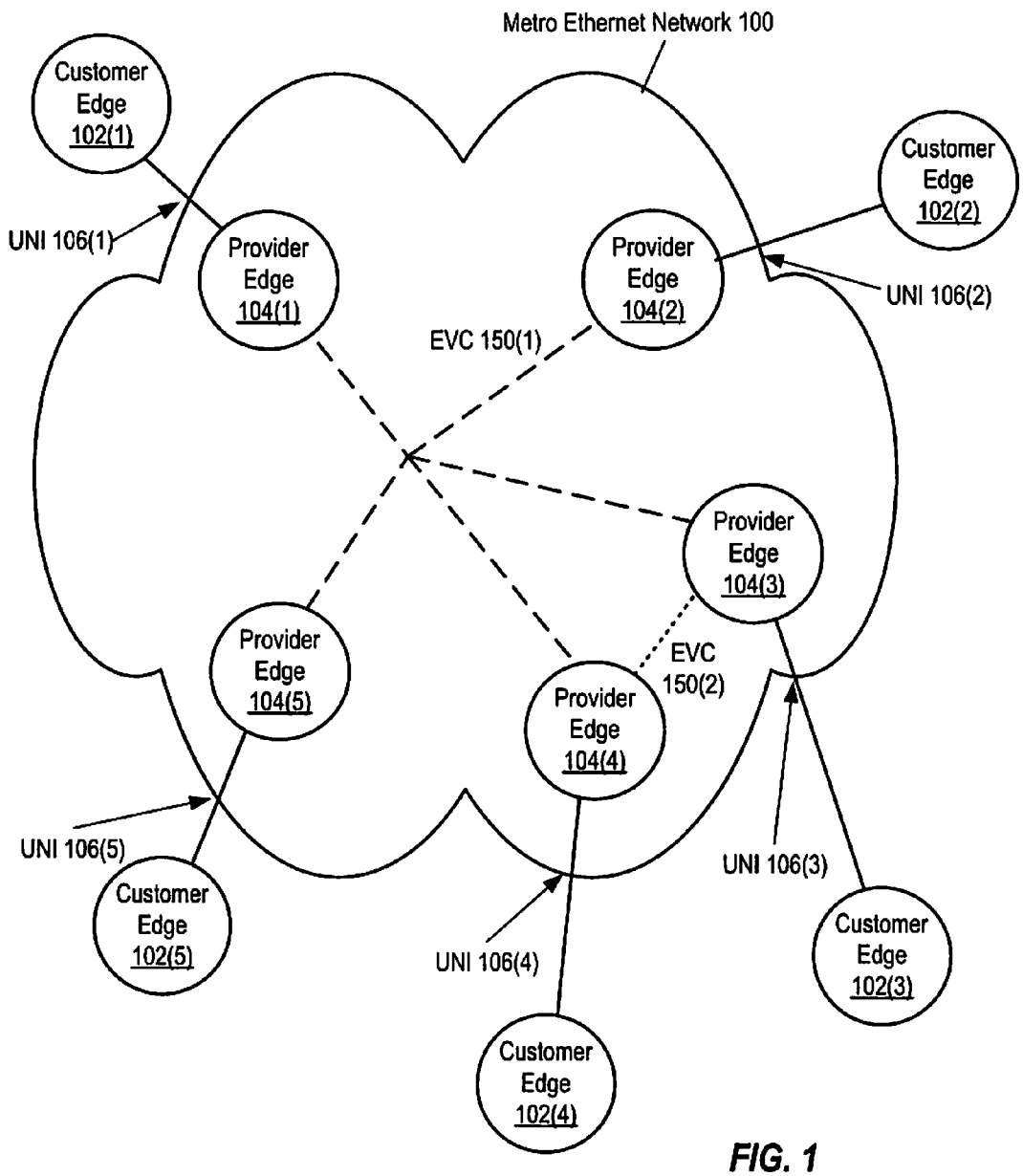
FIG. 1 is a block diagram of a Metro Ethernet Network (MEN) that implements a multipoint-to-multipoint EVC.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A node, which is coupled to a MAN or WAN that provides (or potentially provides) multipoint virtual connections, can perform auto-configuration by automatically assigning IP subnets to the locally available virtual connections. Initially, a customer configures the node with one or more IP subnets to be assigned to appropriate virtual connections. A Service Provider configures the virtual connections within the MAN or WAN. The node receives information identifying the virtual connections that are locally available to the node, and then automatically identifies which other nodes are connected to those virtual connections. The node also identifies the IP subnets configured on those other nodes. Based on the identified virtual connection topology, the node identifies the most-constrained IP subnet and assigns that IP subnet to the virtual connection that satisfies that IP subnet's requirements. In a similar fashion, the node can assign each of the other IP subnets (starting with the next most constrained IP subnet) configured on the node to locally available virtual connections.

Various examples of how such a node can automatically assign IP subnets to locally available virtual connections are provided herein. These examples are provided in the context of a Metro Ethernet Network (MEN); however, it is noted that similar auto-configuration schemes can be implemented within other types of networks that provide multipoint virtual connections, regardless of whether these networks are implemented using Ethernet technology.

FIG. 1 is a block diagram of a Metro Ethernet Network (MEN) that implements a multipoint-to-multipoint EVC. Within MEN 100, each point at which a customer edge device connects to the Service Provider's MEN is referred to as a User-to-Network Interface, or UNI. As shown in this example, MEN 100 includes provider edge devices 104(1)-104(5). Each provider edge (PE) device is attached to a respective customer edge (CE) device 102(1)-102(5) at a respective UNI. In particular, customer edge device 102(1) is coupled to MEN 100 at UNI 106(1). Customer edge device 102(2) is coupled to MEN 100 at UNI 106(2). Customer edge device 102(3) is coupled to MEN 100 at UNI 106(3). Customer edge device 102(4) is coupled to MEN 100 at UNI 106(4). Customer edge device 102(5) is coupled to MEN 100 at UNI 106(5).

It is noted that there may not always be a one-to-one correspondence between customer edge devices and provider edge devices. For example, a single customer edge device can connect to several provider edge devices within the MEN. Similarly, several different customer edge devices can connect to the same provider edge device.

Traffic sent across a UNI is described as being sent in an ingress or egress direction. "Ingress" and "egress" are defined relative to the MEN. Traffic traveling in the ingress direction is being sent from a customer edge device to MEN 100. Traffic traveling in the egress direction is being sent to a customer edge device from MEN 100.

Two EVCs have been implemented within MEN 100. EVC 150(1) (represented by dashed lines) includes UNIs 106(1)-106(5). Accordingly, EVC 150(1) provides a multipoint-to-multipoint connection between customer edge devices 102(1)-102(5). In a multipoint-to-multipoint connection, each customer edge device 102(1)-102(5) can send a message directly to any (or all) of the other customer edge devices coupled by multipoint-to multipoint EVC 150(1).

EVC 150(2) (represented by a dotted line) includes UNIs 106(3)-106(4) and provides a multipoint-to-multipoint connection between customer edge devices 102(3) and 102(4). While EVC 150(2) is currently only being used to connect two customer edge devices (and thus is currently functioning as a point-to-point connection), EVC 150(2) differs from a point-to-point connection in that additional UNIs are allowed to join (and subsequently leave) EVC 150(2) without disrupting EVC 150(2).

Rooted-multipoint EVCs can also be implemented within a network such as MEN 100. Like a multipoint-to-multipoint EVC, a rooted-multipoint EVC is capable of including more than two UNIs. However, unlike a multipoint-to-multipoint EVC, a rooted-multipoint EVC restricts communication between customer edge devices coupled by the rooted-multipoint EVC. In a rooted-multipoint EVC, one or more UNIs are designated as "root" UNIs and all of the other UNIs included in the rooted-multipoint EVC are designated as "leaf" UNIs. The customer edge device coupled to a root UNI can send messages to any of the customer edge devices coupled to root or leaf UNIs. However, the customer edge devices coupled to the leaf UNIs can only send messages to the customer edge device coupled to root UNIs.

Figure 2:
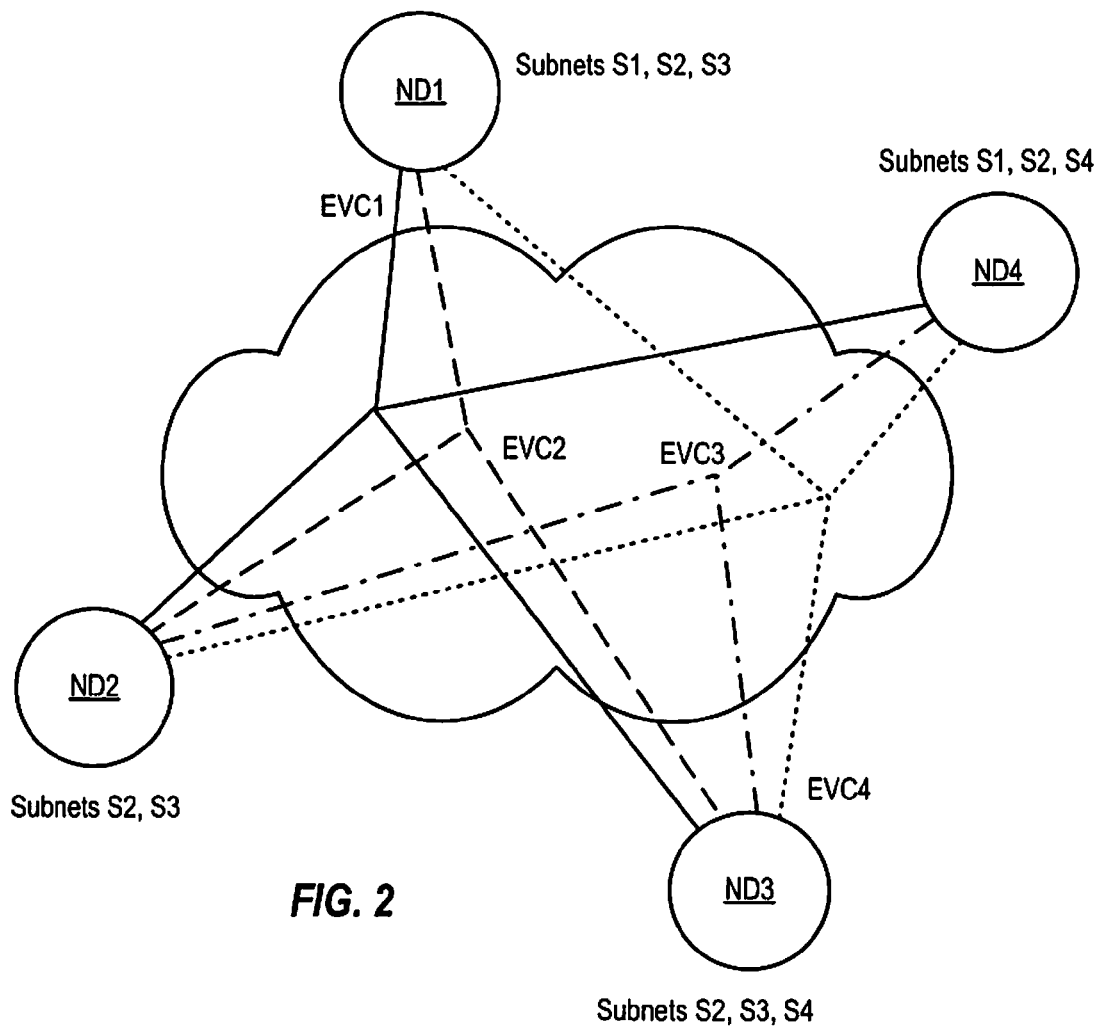
FIG. 2 illustrates four nodes that are configured to automatically identify which EVCs are active and to automatically assign an IP subnet to an active EVC, according to one embodiment of the present invention.

FIG. 2 illustrates four nodes ND1-ND4 that are configured to automatically identify which EVCs are locally available. The nodes are also each configured to automatically assign an IP subnet to one of the identified EVCs. Examples of how nodes ND1-ND4 can assign IP subnets to available EVCs are provided below in the discussions of FIGS. 4A-8.

As shown, Node 1 (ND1) has been configured with IP subnets S1, S2, and S3. EVC1 (represented by solid lines), EVC2 (represented by dashed lines), and EVC4 (represented by a dotted lines) are the locally available EVCs at ND1. Node 2 (ND2) has been configured with IP subnets S2 and S3. EVC1, EVC2, EVC3 (represented by lines that include alternating dashes and dots), and EVC4 are locally available to ND2. Node 3 (ND3) has been configured with IP subnets S2, S3, and S4. EVC1, EVC2, EVC3, and EVC4 are locally available to ND3. Node 4 (ND4) has been configured with IP subnets S1, S2, and S4. EVC1, EVC3, and EVC4 are locally available to ND4.

An administrator can configure each of nodes ND1-ND4 to use one or more IP subnets. Typically, the administrator that configures the IP subnets will be in the employ of the customer that operates nodes ND1-ND4. In contrast, the EVCs will typically be configured by an administrator in the employ of the Service Provider that operates the MEN that includes EVCs EVC1-EVC4.

Figure 3:
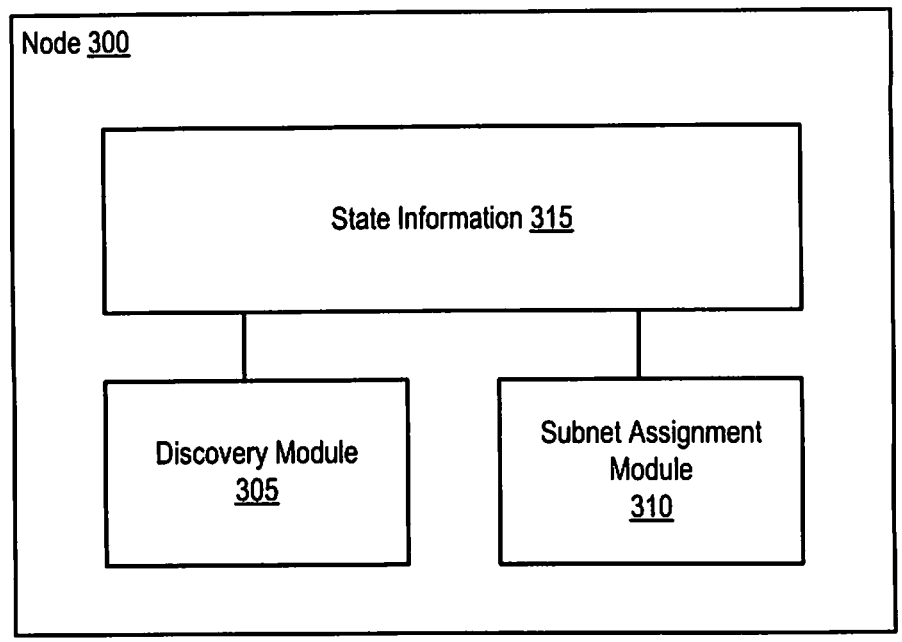
FIG. 3 illustrates a block diagram of a node, according to one embodiment of the present invention.

FIG. 3 illustrates a block diagram of a node 300 (e.g., one of nodes ND1-ND4 of FIG. 2). Node 300 can be any one of a variety of network devices, including routers, switches, bridges, and the like.

In this embodiment, node 300 includes a discovery module 305, a subnet assignment module 310, and state information 315. Discovery module 305 and subnet assignment module 310 can each be implemented in hardware, software, or a combination of hardware and software. It is noted that node 300 can include a variety of other components (e.g., such as network interfaces or ports, routing tables, and so on) and implement a variety of other functionality; however, for simplicity, only these components are illustrated in FIG. 3. More details regarding possible implementations of node 300 are provided in FIGS. 10 and 11, which are described below.

State information 315 stores information used to assign EVCs (or other virtual connections) to IP subnets, as well as the assignments themselves. State information 315 can be stored in any of a variety of suitable storage media. State information 315 can include information identifying the IP subnets to be assigned, information identifying the locally available EVCs, and information identifying which IP subnets are assigned to which EVCs.

When an administrator configures a node with IP subnets, the administrator can access a user interface (e.g., a command line interface (CLI), graphical user interface (GUI), or the like) to node 300 and enter information identifying the IP subnets via that user interface. An administrator can also (or alternatively) use an administration tool that implements a programmatic interface such as Simple Network Management Protocol (SNMP) or eXtensible Markup Language (XML) to interface with a node. In response to receiving the information identifying IP subnets from an administrator, node 300 can store information identifying the IP subnets as part of state information 315.

Discovery module 305 is configured to discover which EVCs are locally available and to store information identifying the locally available EVCs as part of state information 315. Discovery module 305 can discover which EVCs are locally available in a variety of ways. In one embodiment, discovery module 305 is configured to receive that information from an administrator via a user or programmatic interface.

In other embodiments, discovery module 305 implements a protocol, such as Ethernet Local Management Interface (E-LMI), that lets customer equipment, such as node 300, learn about EVCs available at the UNI to which the customer equipment is coupled. In this protocol, Service Provider equipment at a UNI delivers protocol messages to the customer equipment at the UNI. The customer equipment then extracts information, such as information identifying the EVCs available at the UNI, and storing that information as part of state information 315.

Subnet assignment module 310 is configured to use state information 315 to assign IP subnets to locally available EVCs, and to write information identifying the assignments in state information 315. Subnet assignment module 310 can implement a protocol that allows node 300 to communicate with other nodes, via the locally available EVCs or any other suitable communication channel, in order to discover the topology of the EVCs in the MEN and to identify assignments that are consistent with assignments made at other nodes coupled to the MEN. Furthermore, once the correct assignment of IP subnets to EVCs is established, subnet assignment module 310 can use Address Resolution Protocol (ARP) to obtain the IP address-to-Media Access Control (MAC) address binding of the remote nodes coupled to node 300 by the locally available EVCs.

Subnet assignment module 310 can perform auto-configuration (e.g., by assigning IP subnets to EVCs) without having global knowledge of the entire topology of the MEN. Furthermore, the protocol used by subnet assignment module 310 to perform auto-configuration does not require node 300 (or any other node) to obtain and/or distribute global knowledge of the entire MEN topology to other nodes. In some situations, information identifying the entire network topology will be obtained and/or distributed by a single node; however, such a distribution is not necessary in all situations. In other words, in many situations, a given node may successfully auto-configure itself without knowing the entire network topology. For example, a given node can successfully auto-configure itself without knowing the identity of all EVCs within and/or all other nodes coupled to the MEN.

As the discussion below will emphasize, since node 300 may not have a complete picture of the entire topology of the MEN to which node 300 is coupled, subnet assignment module 310 can exchange one or more sets of messages with subnet assignment modules in other nodes in order to ensure that assignments made at each node are synchronized. In one embodiment, to be synchronized, all nodes assigning a given IP subnet must assign that IP subnet to the same EVC.

Initially, the messages exchanged between subnet assignment modules in different nodes can simply include topology information. For example, initially, subnet assignment module 310 can send a message that identifies node 300 (e.g., by a globally unique node identifier), as well as the IP subnets that have been configured on node 300, on each EVC that is locally available to node 300 (thus, this message may not be sent on all EVCs, since node 300 may be coupled to fewer than all EVCs). Alternatively, such a message can be sent via another communication channel that couples node 300 to other nodes coupled to the MEN.

The globally unique identifier that can be used to name node 300 (and thus the UNI to which node 300 is attached at that point in time) can be any identifier that is guaranteed to be unique among nodes coupled to the MEN. For example, the globally unique identifier can be the MAC address of an Ethernet Network Interface Card (NIC) that is included within node 300 and attached to the Ethernet WAN.

In one embodiment, EVC identifiers are generated by each node. Initially, each node assigns a unique provisional identifier to all locally available EVCs. Each node will generate a locally unique number and then combine that number with the node's globally unique identifier (e.g., by appending, prepending, or otherwise combining the globally unique identifier of the node with the locally unique identifier generated for the EVC). When a node sends a message identifying the node and the subnets configured on that node via a particular EVC, the sending node can include its provisional identifier for that EVC in the message. After the sending node receives messages from the other nodes coupled to that EVC, the sending node can use a prespecified algorithm to sort the EVC identifiers and to select one of the EVC identifiers as the non-provisional identifier (e.g., all nodes can be configured to select the lowest provisional EVC identifier for use as the non-provisional EVC identifier). As a result of this exchange, all nodes coupled to the same EVC will select the same non-provisional EVC identifier.

Subnet assignment module 310 will also receive the messages that other nodes have sent via their locally available EVCs (or any other suitable communication channel). Like the messages sent by subnet assignment module 310, these messages can include a globally unique identifier that identifies the sending node as well as a list of IP subnets configured on the sending node. Note that subnet assignment module 310 may not receive messages from all of the other nodes coupled to the same MEN, since some of those nodes may only be coupled to EVCs that are not locally available to node 300.

Node 300 uses the messages received from other nodes to determine which EVCs the other nodes are associated with and which IP Subnets are of common interest. Receipt of a message from a particular node via a particular EVC (or receipt of a message that otherwise contains information indicating that the particular EVC is locally available to the sending node) indicates that the EVC is locally available to the sending node. Accordingly, in response to node 300 receiving a message via a particular EVC, subnet assignment module 310 can generate information associating that EVC with the globally unique identifier of the sending node. Subnet assignment module 310 can also generate information associating the IP subnets identified within the message with the sending node. For example, if node 300 receives a message from node X via EVC1, and that message identifies IP subnets S2 and S4, subnet assignment module 310 can generate information indicating that node X is coupled to EVC1 and that node X needs to assign IP subnets S2 and S4. Such information can be stored, at least temporarily, as part of state information 315. In one embodiment, such information is stored in a table like those shown in FIGS. 4A-4D.

In some embodiments, subnet assignment module 310 can disregard certain messages. For example, in one embodiment, subnet assignment module 310 only extracts information from messages that identify an IP subnet that has been configured on node 300 and that are received via active EVCs.

In one embodiment, the protocol used by subnet assignment module 310 to exchange topology information is implemented using Ethernet messages, since the Transmission Control Protocol (TCP)/IP protocol stack may not yet be available at the point (for example, during startup of node 300) at which auto-configuration is being performed (e.g., because IP address may not yet have been assigned). Since Ethernet does not provide for reliable transport, the protocol can be configured such that each node will resend identical messages until the node receives an acknowledgement or other indication that the message was received.

Information exchanged by the protocol can include the node identifier described above, as well as the EVC identifiers described above. The messages exchanged by the protocol can also include information usable by subnet assignment module 310 to determine the "freshness" of each message, such as a clock value representing the relative time at which each message was sent. Similarly, each message exchanged by the protocol can include a sequence number generated by the sending node, such that consecutive messages sent by a given node will have consecutive ascending or descending sequence numbers. Subnet assignment module 310 can use the sequence number in received messages in order to determine whether any intervening messages have been lost.

The messages exchanged by the protocol can also include a particular value (e.g., a start delimiter, protocol identifier, or the like) that identifies that these messages are being sent as part of the auto-configuration protocol. This information can cause the messages to be sent to subnet assignment module 310 for handling when received by node 300, and can also indicate that the messages are formatted in a manner that complies with the auto-configuration protocol. The messages can also include a checksum or other integrity information usable by subnet assignment module 310 to verify the messages.

As noted above, the body of the messages exchanged via the protocol can include topology information, such as a node identifier, a list of subnet(s) configured on the identified node, entropy values (e.g., the subnet (S) and/or EVC (E) entropy values described below), and the like. Such information can be organized in a vector, array, or matrix. Accordingly, the message can include information that identifies the dimensions of the array in terms of rows and/or columns (e.g., an N×M array), the identity of each dimension (e.g., columns can be associated with EVCs and rows can be associated with subnets), the format of the information stored in the array (e.g., comma separated values, or the like), and the type of information stored in the array (e.g., node identifiers, integers, etc.).

In one embodiment, information within each message is encoded using {Type, Length, Value} (TLV) triplets, where the value of the Type field indicates the type of information, the value of the Length field indicates the total length of the Value field. The Value field includes information that is appropriate to the specified Type. For example, the value of the Type field can be "Array," and the value of Length can include several sub-fields specific to the Array type. The first sub-field can be a fixed-length field that indicates the dimensionality of the array. The second sub-field can be a fixed-length field that indicates the length of a variable-length third sub-field, which in turn can contain a comma separated list of alphanumeric tags that indicate what (e.g., IP subnet, EVC, or the like) each dimension of the array represents. The fourth sub-field can be a fixed-length field that describes the content (e.g., node identifiers, integers, or the like) of each cell within the array. A fifth fixed-length sub-field can indicate the length of the sixth sub-field, which can indicate the value or values for the information described by fourth sub-field.

In one embodiment, associations between values (e.g., associations between EVCs, IP subnets, and/or node identifiers) can be encoded using arrays. For example, the array can include fields indicating the dimensions of the array, the variables that may be associated, and the values of those variables. An additional field in the array can indicate an association status of a set of values (e.g., zero (0) can indicate no association between the values and one (1) can indicate that the values are associated). It is noted that some variables can have values that are determined based upon characteristics of the message itself (e.g., the value of an EVC variable can be the identifier of the EVC via which the message was received).

The protocol can also include various message types. Various message types can be used to confirm status (e.g., one node can send such a message to another node to indicate that the sending node is still active or to request status from another node), request the sequence number of the last message sent by a remote node, and request that certain messages be resent (e.g., in response to detecting that a message containing a particular sequence number has not been received, a node can request that the message having that sequence number be resent). Similarly, various message types can be used to request the state of another node and to send the local state to another node. One message type can be used to signal the occurrence of error conditions (e.g., in one embodiment, receipt of such a message can cause the auto-configuration process to restart). Other message types can be used to signal changes in configuration information (e.g., if a new node is attached to the MEN or if an existing node is shutting down, such a message can be used to inform all the other nodes of the change or imminent change). Still other message types can be used to request particular types of information, to convey particular types of information, and the like.

In one embodiment, the protocol allows information be broken up into multiple messages. Thus, the messages can include a value that indicates the appropriate order of individual messages (e.g., message 1 of N, message 2 of N, and the like), allowing subnet assignment module 310 to reassemble the information from the multiple messages.

In one embodiment, the information contained within the messages is encoded as American Standard Code for Information Interchange (ASCII) strings (e.g., for non-numeric information) and/or as hexadecimal digits (e.g., for numeric information). Other encodings can be used, as appropriate.

Based upon the local information (e.g., the information stored in state information 315) and the information received from the other nodes, subnet assignment module 310 can then begin the process of assigning IP subnets to EVCs. Subnet assignment module 310 first identifies the IP subnet that is most constrained, and assigns that IP subnet to an EVC that satisfies the most constrained IP subnet's connectivity requirements. For example, if there is only one EVC that satisfies the connectivity requirements of an IP subnet, then that EVC should be assigned to that IP subnet. If there are several EVCs that satisfy the requirements of the IP subnet, then subnet assignment module 310 can select one of those EVCs.

In one embodiment, the process of identifying the most constrained IP subnet involves several actions. Initially, for each unique pairing of IP subnets (using those IP subnets that have been configured on node 300) and EVCs (using those EVCs that are active and locally available to node 300), subnet assignment module 310 can identify the set of nodes that are both configured with that IP subnet and coupled to that EVC (e.g., by constructing a subnet-to-EVC incidence table like those shown in FIGS. 4A-4D). For example, if node 300 has been configured with two IP subnets SA and SB and is coupled to three EVCs EVC1-EVC3, there will be six possible IP subnet-to-EVC pairs: (SA, EVC1), (SA, EVC2), (SA, EVC3), (SB, EVC1), (SB, EVC2), and (SB, EVC3). For each subnet-to-EVC pair, subnet assignment module 310 can identify the node(s), if any, that are both configured with that IP subnet and coupled to that EVC. These node(s) are then associated with that IP subnet-to-EVC pair.

For each subnet, subnet assignment module 310 can then determine which subnet-to-EVC pair is associated with the greatest number of nodes (e.g., by constructing a maximal subnet-to-EVC incidence table like those shown in FIGS. 5A-5D). For example, if there are three subnet-to-EVC pairs for a given subnet, subnet assignment module 310 compares the number of nodes associated with each of those three pairs. It is noted that, for each subnet, there may be more than one subnet-to-EVC pair that is associated with the greatest number of nodes.

Subnet assignment module 310 can also calculate a subnet entropy value for each subnet. This subnet entropy value indicates how many EVCs satisfy the requirements of each subnet. The subnet entropy value for a subnet equals the number of subnet-to-EVC pairs associated with that subnet that are associated with a maximum number of nodes. Thus, the subnet entropy value indicates how constrained an associated subnet is.

After identifying the subnet-to-EVC pair (or pairs) associated with the greatest number of nodes for each subnet, subnet assignment module 310 identifies the subnets whose requirements can be satisfied by each EVC. Subnet assignment module 310 identifies these subnets by identifying, for a given EVC, which subnet-to-EVC pairs are associated with the greatest number of nodes. Thus, if three subnets are associated with a particular EVC, subnet assignment module 310 determines which, if any, of the three corresponding subnet-to-EVC pairs has been identified as being associated with the greatest number of nodes for an associated subnet. If one of the pairs has been so identified, then subnet assignment module 310 identifies that the corresponding subnet's requirements can be satisfied by the associated EVC. Subnet assignment module 310 then sends information identifying the subnets (if any) that can be satisfied by that EVC to other nodes via the corresponding EVC (e.g., by sending a message containing a collision indication vector like those shown in FIG. 6) or some other appropriate communication channel.

In response to receiving similar information from other nodes, subnet assignment module 310 may receive information identifying subnets that other nodes are interested in assigning but that have not been configured on node 300. In response to receiving such information, subnet assignment module 310 can identify the EVCs that satisfy the requirements of these subnets. Based upon this information, and the information about the subnet-to-EVC pairs described above, subnet assignment module 310 can determine an EVC entropy for each EVC. This EVC entropy value identifies the number of subnets whose requirements an associated EVC can satisfy.

Once subnet assignment module 310 has obtained a subnet entropy value for each subnet and an EVC entropy value for each EVC and has received CIVs from all of the other nodes, subnet assignment module 310 can generate a message identifying a proposed assignment. The proposed assignment identifies the subnet of interest to node 300 that has the lowest subnet entropy and an EVC that satisfies the selected subnet's requirements. The selected EVC also has the lowest EVC entropy of the EVCs that satisfy the selected subnet's requirements. If there is a tie between subnets or EVCs (i.e., if multiple subnets have the same subnet entropy or if multiple EVCs have the same EVC entropy), subnet assignment module 310 can use a prespecified algorithm to break the tie (e.g., as described below, subnet assignment module 310 can be configured to select the "lowest" subnet or EVC in such a situation).

Once subnet assignment module 310 has selected a potential assignment, subnet assignment module 310 generates a message containing node 300's identifier, the identifier of the selected subnet and the identifier of the selected EVC, and the subnet entropy of the selected subnet. Subnet assignment module 310 then sends this message on the selected EVC (or some other appropriate communication channel).

Subnet assignment module 310 also receives proposed assignments from the other nodes. If the proposed assignments are not identical for a given EVC, subnet assignment module 310 uses a prespecified algorithm (e.g., selecting the subnet with the lowest subnet entropy and/or the lowest subnet if multiple subnets have the same subnet entropy) to select the subnet to assign and then assigns that subnet to the EVC. If the selected subnet is a subnet of interest to node 300, subnet assignment module 310 will generate state information identifying the assignment for storage in state information 315.

Subnet assignment module 310 can then recalculate the subnet and EVC entropies in a manner that disregards the subnet that has just been assigned and the EVC to which that subnet has been assigned. Based upon the new entropy values, subnet assignment module 310 can then generate a new proposed assignment message and participate in a second round of message exchange with the other nodes. This process repeats until subnet assignment module 310 has assigned all subnets of interest to node 300. By synchronizing each IP subnet assignment (or at least each assignment that may potentially cause a conflict) with other nodes before actually committing to that assignment, subnet assignment module 310 ensures that the assignments made by node 300 will be consistent with the assignments made by other nodes.

Accordingly, subnet assignment module 310 is configured to prioritize subnet-to-EVC assignments in such way that the most constrained subnet (the subnet that has the lowest subnet entropy) is assigned first. For example, if there is only one EVC at satisfies the connectivity requirements of an IP Subnet, then that EVC should be assigned to that IP Subnet. If one subnet's connectivity requirements can be satisfied by four EVCS and a second subnet's connectivity requirements can only be satisfied by two EVCs, then the second subnet should be assigned first. In some embodiments, subnet assignment module 310 can calculate an entropy value for each subnet and EVC in order to identify how flexible or how constrained the potential mappings are.

FIGS. 4A-8 illustrate how the nodes in FIG. 2 can assign IP subnets to EVCs according to one embodiment. It is noted that other techniques can be used in other embodiments.

FIGS. 4A-4D each illustrate a Subnet-to-EVC incidence (SEI) table that can generated by a respective one of the four nodes of FIG. 2. Each SEI table is organized into rows associated with subnets and columns associated with EVCs. Each cell within an SEI table stores information (e.g., one or more globally unique identifiers) identifying one or more nodes. The SEI table identifies the IP subnets that need to be assigned by a particular node and the EVCs that are candidates to have those IP subnets assigned to them. The SEI table also identifies the nodes that can be reached by each EVC.

FIG. 4A illustrates a SEI table that can be generated by node ND1 of FIG. 2. As shown in FIG. 2, node ND1 is coupled to active EVCs EVC1, EVC2, and EVC4. Accordingly, node ND1 can construct an SEI table with three columns (one column for each active EVC that is locally available to ND1). Additionally, node ND1 has been configured with subnets S1, S2, and S3. Thus, node ND1 can include three rows in the SEI table (one row for each subnet configured on ND1).

Initially, ND1 can send messages on each of EVCs EVC1, EVC2, and EVC4 that identify ND1 and that identify the subnets S1, S2, and S3 configured on ND1. In addition to sending messages to other nodes to indicate the subnets of interest to ND1, ND1 will also update the cells corresponding to the locally available EVCs and locally configured subnets to indicate that ND1 is potentially interested in assigning each locally configured subnet to each locally available EVC. In particular, node ND1 will add ND1 to the cells corresponding to (S1, EVC1), (S1, EVC2), (S1, EVC4), (S2, EVC1), (S2, EVC2), (S2, EVC4), (S3, EVC1), (S3, EVC2), and (S3, EVC4).

ND1 can also receive messages sent by nodes coupled to EVCs EVC1, EVC2, and EVC4. Accordingly, ND1 will receive messages from node ND2 via EVCs EVC1, EVC2, and EVC4. These messages identify node ND2 and the subnets S2 and S3 configured on node ND2. In response to receiving the message from node ND2 via EVC1, node ND1 will add ND2 to the cells corresponding to (S2, EVC1) and (S3, EVC1). In response to receiving the message from node ND2 via EVC2, node ND1 will add ND2 to the cells corresponding to (S2, EVC2) and (S3, EVC2). In response to receiving the message from node ND2 via EVC4, node ND1 will add ND2 to the cells corresponding to (S2, EVC4) and (S3, EVC4).

Node ND1 will also receive similar messages from node ND3 via EVCs EVC1, EVC2, and EVC4. ND3 is configured with subnets S2, S3, and S4. Accordingly, node ND1 will add ND3 to the cells corresponding to (S2, EVC1), (S2, EVC2), (S2, EVC4), (S3, EVC1), (S3, EVC2), and (S3, EVC4). Since node ND1 is not configured with subnet S4, ND1 will not add information about S4 to its table, despite receiving such information from ND3.

Node ND1 receives messages from node ND4 via EVCs EVC1 and EVC4. ND4 is interested in assigning subnets S1, S2, and S4. Accordingly, node ND1 will add ND4 to the cells corresponding to (S1, EVC1), (S2, EVC1), (S1, EVC4), and (S2, EVC4).

FIG. 4B illustrates an SEI table that can be generated by node ND2 of FIG. 2. As shown in FIG. 2, node ND2 is coupled to all four EVCs EVC1, EVC2, EVC3, and EVC4. Accordingly, node ND2's SEI table includes four columns, one for each EVC. Node ND2 has been configured with two subnets, S2 and S3. Accordingly, node ND2's SEI table includes two rows, one for each of subnets S2 and S3.

Initially, node ND2 can send messages on each of the locally available EVCs. These messages identify ND2 (e.g., using a globally unique identifier associated with ND2) as well as the subnets S2 and S3 that ND2 needs to assign. In addition to sending messages to other nodes, ND2 will also update the cells corresponding to the locally available EVCs and locally configured subnets. In particular, node ND2 will add ND2 to the cells corresponding to (S2, EVC1), (S2, EVC2), (S2, EVC3), (S2, EVC4), (S3, EVC1), (S3, EVC2), (S3, EVC3), and (S3, EVC4).

Node ND2 also receives messages via EVCs EVC1, EVC2, EVC3, and EVC4. In this example, ND2 receives messages from ND1 via EVC1, EVC2, and EVC4. These messages indicate that node ND1 is interested in assigning subnets S1, S2, and S3. Accordingly, node ND2 will add ND1 to the cells corresponding to (S2, EVC1), (S2, EVC2), (S2, EVC4), (S3, EVC1), (S3, EVC2), and (S3, EVC4).

ND2 receives messages from ND3 via EVC1, EVC2, EVC3, and EVC4. These messages indicate that node ND3 is interested in assigning subnets S2, S3, and S4. Accordingly, node ND2 will add ND3 to the cells corresponding to (S2, EVC1), (S2, EVC2), (S2, EVC3), (S2, EVC4), (S3, EVC1), (S3, EVC2), (S3, EVC3), and (S3, EVC4).

ND2 receives messages from ND4 via EVC1, EVC3, and EVC4. These messages indicate that node ND4 is interested in assigning subnets S1, S2, and S4. Accordingly, node ND2 will add ND4 to the cells corresponding to (S2, EVC1), (S2, EVC3), and (S2, EVC4).

FIG. 4C illustrates an SEI table that can be generated by node ND3 of FIG. 2. As shown in FIG. 2, node ND3 is coupled to all four EVCs EVC1, EVC2, EVC3, and EVC4. Accordingly, node ND3's SEI table includes four columns, one for each EVC. Node ND3 has been configured with subnets S2, S3 and S4. Accordingly, node ND3's SEI table includes three rows, one for each of subnets S2, S3, and S4.

Initially, node ND3 can send messages on each EVC that is locally available to node ND3. These messages identify ND3 as well as each subnet S2, S3, and S4 that has been configured on ND3. In addition to sending messages to other nodes to indicate the subnets of interest to ND3, ND3 will also update the cells corresponding to the locally available EVCs and locally configured subnets. In particular, node ND3 will add ND3 to the cells corresponding to (S2, EVC1), (S2, EVC2), (S2, EVC3), (S2, EVC4), (S3, EVC1), (S3, EVC2), (S3, EVC3), (S3, EVC4), (S4, EVC1), (S4, EVC2), (S4, EVC3), and (S4, EVC4).

Node ND3 receives messages via EVCs EVC1, EVC2, EVC3, and EVC4. In this example (which, as noted above, corresponds to the network topology shown in FIG. 2), ND3 receives messages from ND1 via EVC1, EVC2, and EVC4. These messages indicate that node ND1 is configured with subnets S1, S2, and S3. Accordingly, node ND3 will add ND1 to the cells corresponding to (S2, EVC1), (S2, EVC2), (S2, EVC4), (S3, EVC1), (S3, EVC2), and (S3, EVC4).

ND3 receives messages from ND2 via EVC1, EVC2, EVC3, and EVC4. These messages indicate that node ND2 is interested in assigning subnets S2 and S3. Accordingly, node ND3 will add ND2 to the cells corresponding to (S2, EVC1), (S2, EVC2), (S2, EVC3), (S2, EVC4), (S3, EVC1), (S3, EVC2), (S3, EVC3), and (S3, EVC4).

ND3 receives messages from ND4 via EVC1, EVC3, and EVC4. These messages indicate that node ND4 is interested in assigning subnets S1, S2, and S4. Accordingly, node ND3 will add ND4 to the cells corresponding to (S2, EVC1), (S2, EVC3), (S2, EVC4), (S4, EVC1), (S4, EVC3), and (S4, EVC4).

FIG. 4D illustrates an SEI table that can be generated by node ND4 of FIG. 2. As shown in FIG. 2, node ND4 is coupled to EVCs EVC1, EVC3, and EVC4. Accordingly, node ND4's SEI table includes three columns, one for each of EVCs EVC1, EVC3, and EVC4. Node ND4 has been configured with subnets S1, S2 and S4. Accordingly, node ND4's SEI table includes three rows, one for each of subnets S1, S2, and S4.

Initially, node ND4 can send messages on each EVC that is locally available to node ND4. In other words, ND4 can send messages on EVC1, EVC3, and EVC4. These messages identify ND4 as well as each subnet S1, S2, and S4 that has been configured on ND4. In addition to sending messages to other nodes, ND4 will also update the cells corresponding to the locally available EVCs and locally configured subnets. In particular, node ND4 will add ND4 to the cells corresponding to (S1, EVC1), (S1, EVC3), (S1, EVC4), (S2, EVC1), (S2, EVC2), (S2, EVC4), (S4, EVC1), (S4, EVC3), and (S4, EVC4).

Node ND4 receives messages via EVCs EVC1, EVC3, and EVC4. In this example, ND4 receives messages from ND1 via EVC1 and EVC4. These messages indicate that node ND1 is interested in assigning subnets S1, S2, and S3. Accordingly, node ND4 will add ND1 to the cells corresponding to (S1, EVC1), (S1, EVC4), (S2, EVC1), and (S2, EVC4).

ND4 receives messages from ND2 via EVC1, EVC3, and EVC4. These messages indicate that node ND2 is configured with subnets S2 and S3. Accordingly, node ND4 will add ND2 to the cells corresponding to (S2, EVC1), (S2, EVC3), and (S2, EVC4).

ND4 also receives messages from ND3 via EVC1, EVC3, and EVC4. These messages indicate that node ND3 is configured with subnets S2, S3, and S4. Accordingly, node ND4 will add ND3 to the cells corresponding to (S2, EVC1), (S2, EVC3), (S2, EVC4), (S4, EVC1), (S4, EVC3), and (S4, EVC4).

It is noted that nodes coupled to the same MEN can generate slightly different SEI tables, as shown by the example of FIGS. 4A-4D above. These differences can arise for a variety of reasons. As noted above, one node may not be aware of all the EVCs that are active in the MEN. Equivalently, a particular EVC does not necessarily associate all UNIs in the MEN. As a result, the set of columns of the SEI Table at one node may not be the same as the set of columns of the SEI Table at another node, even though there may be individual columns that are the same.

Similarly, a node attached to one UNI may not wish to configure the same set of subnets as a node attached to another UNI (although there may be some subnets in common to the two nodes). As a result, one node's SEI table may not contain the same rows as an SEI Table generated by another node, even though there may be individual rows that are common.

As will be shown in more detail below, the subnets that are candidates to be assigned to a particular EVC need not be of interest to all the nodes attached to UNIs associated by that particular EVC. In other words, even though an EVC may be available at a UNI to which a node is attached, that node may ultimately not use that EVC (e.g., because other nodes have assigned a subnet to that EVC and the assigned subnet is not configured on the node).

In some embodiments, a node can perform error checking by examining the cell entries within the node's SEI table. Since all nodes that are interested in assigning a particular subnet will also receive messages relating to that subnet on the same set of EVCs, the cell entries should contain the same information. If the number of node identifiers per cell has a maximum number n across a row, and two or more cells have the value it, then these cells should contain the same node identifiers. If the cells do not, an error has occurred and the situation should be flagged. For example, in the row corresponding to subnet S3 in the SEI table of FIG. 4A, the maximum number n of node identifiers per cell is four (based upon the contents of the cells corresponding to (S2, EVC1) and (S2, EVC4)). Since there are two cells that have the maximum number n of node identifiers, node ND1 can perform error checking by comparing the node identifiers within each of those two cells. Here, the node identifiers in the two cells are identical, and thus no error will be detected. If instead the cell corresponding to (S2, EVC1) had identified another node ND5 instead of ND1, not all of the node identifiers would have matched those in the cell corresponding to (S2, EVC4) and node ND1 would, based upon the contents of these cells, detect that an error had occurred.

FIGS. 5A-5D illustrate a set of maximal SEI (MSEI) tables. Like the SEI tables of FIGS. 4A-4D, these MSEI tables can be generated by a subnet assignment module within each node and stored, at least temporarily, as part of the state information maintained by that node. As described in more detail below, nodes can then exchange MSEI tables with each other via the EVCs. Like the SEI tables described above, the MSEI table generated by a given node can differ from the MSEI tables generated by other nodes that are coupled to the same EVC and/or interested in assigning the same subnet.

Initially, each MSEI table identifies EVC and subnet pairs (as represented by cells within the SEI tables) that are candidates for being associated with a maximal set of node identifiers. As shown in FIGS. 4A-4D, each cell within an SEI table can contain one or more node identifiers. A set of node identifiers is maximal if that set contains the node identifiers of all the nodes that have been configured with a given subnet.

The MSEI table contains cells corresponding to each cell in the SEI table, such that for each cell in the SEI table, there is a corresponding cell in the MSEI table. Once a node has established its SEI table, the node can generate the MSEI table by identifying the cells in each row of the SEI table that contain the greatest number of node identifiers. The cells in the MSEI table corresponding to those SEI cells with the greatest number of node identifiers will have a value of one (1); other cells will have a value of zero (0). The MSEI Table identifies the EVCs that are candidates to be assigned to a particular subnet.

FIG. 5A illustrates an MSEI table that can be generated by node ND1 of FIG. 2, based upon the SEI table shown in FIG. 4A. Node ND1 can generate the MSEI table by identifying the cells containing the greatest number of node identifiers in each of the three rows of the SEI table. As shown in FIG. 4A, the cells corresponding to (S1, EVC1) and (S1, EVC4) have the greatest number of node identifiers in the first row. These cells each contain two node identifiers, while the cell corresponding to (S1, EVC2) only contains one node identifier. Accordingly, node ND1 will place a one (1) in the cells of the MSEI table corresponding to (S1, EVC1) and (S1, EVC4) and a zero (0) in the cell of the MSEI table corresponding to (S1, EVC2).

Node ND1 can also sum the cells in this row to obtain a subnet (S) entropy value, which is two (2) in this situation. This value can (at least in some embodiments) also be stored as part of the MSEI table, as shown in FIG. 5A. Since only cells corresponding to maximal sets of router identifiers have a non-zero entry (i.e., one (1)), adding up the cell values along a row is the same as counting the number of appropriate EVCs for a given subnet. Accordingly, the S entropy identifies the number of EVCs that satisfy the requirements of the associated subnet.

ND1 generates the values for the second row of the MSEI table, which corresponds to subnet S2. As shown in FIG. 4A, the greatest number of node identifiers are found in the cells corresponding to (S2, EVC1) and (S2, EVC4) of the row corresponding to subnet S2 in the SEI table. Accordingly, node ND1 places a one (1) in the corresponding cells of the MSEI table, and a zero (0) in the cell corresponding to (S2, EVC2). The S entropy for this row is two (2).

ND1 generates the values for the final row of the MSEI table based upon the row of the SEI table that corresponds to subnet S3. As shown in FIG. 4A, all three cells of this row of the SEI table contain the same number (three (3)) of node identifiers, and thus all three corresponding cells of the MSEI table will contain the value one (1). The S entropy for this row will accordingly be three (3).

FIG. 5B illustrates an MSEI table that can be generated by node ND2 of FIG. 2, based upon the SEI table shown in FIG. 4B. As shown in FIG. 4B, the cells corresponding to (S2, EVC1) and (S2, EVC4) have the greatest number of node identifiers in the first row of ND2's SEI table. Accordingly, node ND2 will place a one (1) in the cells of the MSEI table corresponding to (S2, EVC1) and (S2, EVC4) and a zero (0) in the cells of the MSEI table corresponding to (S2, EVC2) and (S2, EVC3). The S entropy for subnet S2 in ND2's MSEI table is two (2).

The second row of ND2's MSEI table corresponds to subnet S3. As shown in FIG. 4B, the greatest number of node identifiers are found in the cells corresponding to (S3, EVC1), (S3, EVC2), and (S3, EVC4) of the row corresponding to subnet S3 in ND2's SEI table. Accordingly, node ND2 places a one (1) in the corresponding cells of the MSEI table, and a zero (0) in the cell corresponding to (S3, EVC3). The S entropy for this row is three (3).

FIG. 5C illustrates an MSEI table that can be generated by node ND3 of FIG. 2, based upon the SEI table shown in FIG. 4C. As shown in FIG. 4C, the cells corresponding to (S2, EVC1) and (S2, EVC4) have the greatest number of node identifiers in the first row of ND3's SEI table. Accordingly, node ND3 will place a one (1) in the cells of the MSEI table corresponding to (S2, EVC1) and (S2, EVC4) and a zero (0) in the cells of the MSEI table corresponding to (S2, EVC2) and (S2, EVC3). The S entropy for subnet S2 in ND3's MSEI table is two (2).

The second row of ND3's MSEI table corresponds to subnet S3. As shown in FIG. 4C, the greatest number of node identifiers are found in the cells corresponding to (S3, EVC1), (S3, EVC2), and (S3, EVC4) of the row corresponding to subnet S3 in ND3's SEI table. Accordingly, node ND3 places a one (1) in the corresponding cells of the MSEI table, and a zero (0) in the cell corresponding to (S3, EVC3). The S entropy for this row is three (3).

ND3 generates the values for the final row of ND3's MSEI table based upon the row of ND3's SEI table that corresponds to subnet S4. As shown in FIG. 4C, the cells containing the greatest number of node identifiers in this row are the cells corresponding to (S4, EVC1), (S4, EVC3), and (S4, EVC4), and thus all three corresponding cells of the MSEI table will contain the value one (1). The cell corresponding to (S4, EVC2) of the MSEI table will have a value of zero (0). The S entropy for this row will accordingly be three (3).

FIG. 5D illustrates an MSEI table that can be generated by node ND4 of FIG. 2, based upon the SEI table shown in FIG. 4D. As shown in FIG. 4D, the cells corresponding to (S1, EVC1) and (S1, EVC4) have the greatest number of node identifiers in the first row of ND4's SEI table. Accordingly, node ND4 will place a one (1) in the cells of the MSEI table corresponding to (S1, EVC1) and (S1, EVC4) and a zero (0) in the cell of the MSEI table corresponding to (S1, EVC2). The S entropy for subnet S1 in ND4's MSEI table is two (2).

The second row of ND4's MSEI table corresponds to subnet S2. As shown in FIG. 4D, cells having the greatest number of node identifiers are the cells corresponding to (S2, EVC1) and (S2, EVC4) of the row corresponding to subnet S2 in ND4's SEI table. Accordingly, node ND4 places a one (1) in the corresponding cells of the MSEI table, and a zero (0) in the cell corresponding to (S2, EVC3). The S entropy for this row is two (2).

ND4 generates the values for the final row of ND4's MSEI table based upon the row of ND4's SEI table that corresponds to subnet S4. As shown in FIG. 4D, all of the cells in this row contain the same number of node identifiers, and thus all three corresponding cells of ND4's MSEI table will contain the value one (1). The S entropy for this row will accordingly be three (3).

It is noted that, in some situations, the cell with the highest number of entries in a row of an SEI table may not actually correspond to a maximal set of router identifiers. This situation can arise if the network topology does not provide EVCs that satisfy the connectivity requirements of the subnets configured by the customer. Assuming that candidate EVCs provide sufficient connectivity (i.e., assuming that the network topology is one in which all configured subnets can be assigned to suitable EVCs), then for all SEI tables, if a subnet is of interest to a node, then all MSEI tables that include a given subnet as a row will also have the same cells populated with ones. In other words, all nodes that are interested in a particular subnet will identify the same maximal sets in the row of their respective SEI tables corresponding to that subnet.

In some embodiments, the nodes can then exchange MSEI tables. For example, each node can send a copy of its SEI and/or MSEI table on each locally available EVC. Alternatively, to reduce the amount of exchanged information, each node can first generate a condensed version of the MSEI table, which is referred to as the collision indication vector (CIV), and then exchange this CIV (as opposed to exchanging the SEI and/or MSEI tables) with the other nodes. Example CIVs are shown in FIG. 6. The exchanged information (whether in the form of SEI and MSEI tables or CIVs) can then be used to identify the most constrained subnet, as described below.

FIG. 6 shows example CIVs that can be generated and exchanged by each node in the network of FIG. 2. Like the SEI and MSEI tables, these CIVs can be generated by a subnet assignment module within each node and stored, at least temporarily, as part of state information maintained by that node. CIVs are generated for each locally available EVC. For each such EVC, the node compiles a list of subnets that are candidates to be assigned to that EVC. The node can obtain this list using the MSEI table, such that the CIV for a given EVC will include the list of subnets for which the cell corresponding to that EVC in the MSEI table has a value of one (1). The node can then transmit the CIV for a given EVC to other nodes via that EVC.

FIG. 6 illustrates the CIVs that can be generated and received by each node. As shown, node ND1 generates three CIVs. The first CIV generated by ND1 corresponds to EVC1 and identifies the subnets of interest to ND1 that can be satisfied by EVC1. As shown in FIG. 5A, for EVC1, the cells corresponding to subnets S1, S2, and S3 in ND1's MSEI table have a value of one. Accordingly, ND1's CIV indicates that these three subnets can be satisfied by EVC1. After generating the CIV for EVC1, ND1 can send the CIV to the other nodes via EVC1.

ND1 also generates a CIV for EVC2. FIG. 5A shows that the only cell associated with EVC2 in ND1's MSEI table that has a value of one is the cell associated with subnet S3. Accordingly, ND1's CIV for EVC2 only identifies subnet S3. After generating the CIV for EVC2, ND1 can send the CIV to other nodes via EVC2.

All of the cells associated with EVC4 in ND1's MSEI table have a value of one, and thus each of the corresponding subnets S1, S2, and S3 are identified in ND1's CIV for EVC4. After generating this CIV, ND1 can send the CIV via EVC4.

Node ND2 can generate CIVs for EVC1, EVC2, EVC3, and EVC4. As above, each CIV is associated with a single EVC and is generated by scanning the column of ND2's MSEI table (shown in FIG. 5B) that corresponds to the associated EVC for cells having a one value, and then listing the subnet(s) associated with those cells in the CIV. Accordingly, for EVC1, ND2 can scan the first column of ND2's MSEI table. Both cells in this column have a value of one. The first cell in this column corresponds to S2 and the second cell corresponds to S3. As a result, ND2 a CIV for EVC1 that identifies subnets S1 and S2. Once this CIV has been generated, ND2 can send this CIV via EVC1.

Similarly, ND2's CIV for EVC2 identifies subnet S3, since only one cell, which corresponds to subnet S3, has a value of one in the column corresponding to EVC2 in ND2's MSEI table. This CIV can be sent by ND2 via EVC2.

The column corresponding to EVC3 in ND2's MSEI table does not have any cells with a value of one, and thus ND2's CIV for EVC3 does not identify any subnets. Accordingly, ND2 can either send a blank CIV (i.e., a CIV that does not list any subnets) on EVC3 or not send any CIV via EVC3.

ND2's CIV for EVC4 identifies subnets S2 and S3, since both cells of ND2's MSEI table in the column corresponding to EVC4 have a value of one. Once generated, ND2 sends this CIV via EVC4.

In a similar fashion, ND3 and ND4 generate CIVs for each locally available EVC and send those CIVs on the appropriate EVC. In particular, ND3 sends a CIV identifying subnets S2, S3, and S4 on EVC1. ND3 also sends a CIV identifying subnet S3 on EVC2, and a CIV identifying subnet S4 on EVC3. ND3 sends a CIV identifying subnets S2, S3, and S4 via EVC4.

Likewise, ND4 sends a CIV on EVC1 that identifies subnets S1, S2, and S4. ND4 sends a CIV on EVC3 that identifies subnet S4. ND4 also sends a CIV on EVC4 that identifies S1, S2, and S4.

It is noted that each node may send slightly different CIVs for the same EVC. However, after all of the CIVs are exchanged, each node interested in assigning a subnet to a particular EVC should receive information identifying all subnets that are candidates to be assigned to that EVC.

As described above, all four nodes will send respective CIVs on EVC1, and thus each node will receive the CIVs generated by the other three nodes via EVC1. Accordingly, node ND1 will receive the CIVs generated by nodes ND2, ND3, and ND4, which cumulatively (in combination with ND1's CIV for EVC1) identify subnets S1, S2, S3, and S4. Accordingly, as shown in FIG. 6, node ND1 receives CIVs identify all four subnets for EVC1. The other nodes similarly receive CIVs via EVC1 that cumulatively identify all four subnets.

For EVC2, nodes ND1, ND2, and ND3 each send identical CIVs on EVC2. Cumulatively, these CIVs only identify subnet S3. Node ND4 is not coupled to EVC2 and thus neither sends nor receives a CIV for this EVC.

For EVC3, nodes ND3 and ND4 each send identical CIVs identifying subnet S4 on EVC3. Thus, these CIVs cumulatively only identify subnet S4. Node ND1 is not coupled to EVC3 and thus neither sends nor receives a CIV for this EVC.

All four nodes send a respective CIV via EVC4, and thus each node will receive CIVs from the other three nodes via EVC4. Cumulatively, these CIVs identify all four subnets S1, S2, S3, and S4.

Based upon the total information obtained from the CIVs (both generated locally and received from other nodes), each node can generate an expanded MSEI table. In some embodiments, the expanded MSEI table is generated by modifying the existing MSEI table; in other embodiments, an entirely new table can be created. FIGS. 7A-7D illustrate expanded MSEI tables that can be respectively created by nodes ND1, ND2, ND3, and ND4. These expanded MSEI tables can be generated by a subnet assignment module within each node and stored, at least temporarily, as part of state information maintained by each node.

Upon receiving a CIV for an EVC via that EVC, the node creates an expanded MSEI table. The expanded MSEI table includes the same information as the original MSEI table, with the possible addition of one or more "shadow" rows. The shadow rows correspond to subnets that other nodes (but not the node generating the expanded MSEI table) are interested in assigning to EVCs that are locally available to the node generating the expanded MSEI table. These shadow rows are generated in response to the node receiving a CIV that identifies one or more different subnets than the corresponding CIV generated by the receiving node. For example, as shown in FIG. 6, ND1 sends a CIV on EVC1 that identifies subnets S1, S2, and S3, but receives CIVs identifying subnet S4. Accordingly, even though (as shown in FIG. 2) ND1 is not configured with S4, ND1 will add a shadow row, labeled S4* in FIG. 7A, corresponding to S4 in ND1's expanded MSEI table.

It is noted that only distinct subnets merit an entry in the expanded MSEI tables. Thus, even if a subnet is listed in multiple CIVs for a particular EVC, only one new row for that Subnet is created. This ensures that the MSEI table only contains one row per subnet.

FIG. 7A shows ND1's expanded MSEI table. As noted above, the expanded MSEI table includes a shadow row (identified as being a shadow row by the presence of the asterisk in the row name) corresponding to subnet S4. Node ND1 generates the values for the cells in the shadow row based upon the information in the received CIVs. Since some CIVs received via EVCs EVC1 and EVC4 identify subnet S4, ND1 will place a value of one (1) in the cells corresponding to these EVCs in the shadow row. Since none of the CIVs received via EVCs EVC2 and EVC3 identified S4, ND1 will place a value of zero (0) in the cells corresponding to these EVCs in the shadow row.

Once a shadow row has been generated for each new subnet identified in a received CIV, ND1 can calculate the EVC (E) entropy by summing the values in each column. This sum includes any values present in shadow rows. Accordingly, for the first column, which corresponds to EVC1, ND1 sums the values in each cell to get a total of four (4). Similarly, the sum of the cells corresponding to EVC2 is one (1), and the sum of the cells corresponding to EVC4 is four (4).

A node will never assign a subnet in which the node has no interest. In other words, a node only assigns subnets that have been configured on that node. To distinguish subnets in which the node has an interest from subnets that the node learned from CIVs, the node will tag the latter subnets in the expanded MSEI table (e.g., by appending an asterisk ("*"), a particular letter (e.g., "c") to or otherwise modifying the identifiers of such subnets).

FIG. 7B shows the expanded MSEI table generated by ND2. As shown, ND2 has added two shadow rows, one corresponding to S1 and another corresponding to S4. ND2 has generated values of one (1) in the cells corresponding to (S1, EVC1), (S1, EVC4), (S4, EVC1), (S4, EVC3), and (S4, EVC4). The other new cells all have a value of zero (0).

ND2 also calculates the E entropy for each EVC. In this example, the E entropy for EVCs EVC1 and EVC4 are four (4), while the E entropy for EVCs EVC2 and EVC3 are one (1).

FIG. 7C shows the expanded MSEI table generated by ND3. As shown, ND3 has added a shadow row corresponding to S1. ND3 has generated values of one (1) in the cells corresponding to (S1, EVC1) and (S1, EVC4). The other new cells all have a value of zero (0).

ND3 also calculates the E entropy for each EVC. In this example, the E entropy for EVCs EVC1 and EVC4 are four (4), while the E entropy for EVCs EVC2 and EVC3 are one (1).

FIG. 7D shows the expanded MSEI table generated by ND4. As shown, ND4 has added a shadow row corresponding to S3. ND3 has generated values of one (1) in the cells corresponding to (S3, EVC1) and (S3, EVC4). The other new cell has a value of zero (0).

ND4 also calculates the E entropy for each EVC. In this example, the E entropy for EVCs EVC1 and EVC4 are four (4), while the E entropy for EVC3 is one (1).

A node can begin to propose subnet-to-EVC assignments based upon information in that node's expanded MSEI table. Before proposing subnet-to-EVC assignment, the subnet assignment module within the node can verify that every node that is interested in assigning that EVC has responded with a CIV. In one embodiment, the subnet assignment protocol that the subnet assignment module uses to exchange information with other nodes can support, for each locally available EVC, a polling sequence or a soak time or require that a certain number of messages be received without causing the content of the expanded MSEI table to change.

Once the subnet assignment module within a node is certain that all interested nodes have provided CIVs and has incorporated any new subnets identified in those CIVs into the node's expanded MSEI table, the subnet assignment module can generate a proposed subnet-to-EVC assignment for the most constrained subnet in which the node is interested. Prior to actually making that assignment, the node will exchange information with other nodes in order to synchronize assignments.

FIG. 8 illustrates information that can be exchanged by the nodes of FIG. 2 prior to any node assigning a subnet to an EVC. This information can be generated by a subnet assignment module within each node and stored, at least temporarily, as state information by each node.

Initially, each node selects the subnet having the lowest S entropy. For the selected subnet, each node selects the candidate EVC having the lowest E entropy. The subnet assignment module within the node then generates a message containing the node's globally unique identifier, the subnet identifier of the selected subnet, the S entropy value associated with that subnet, and the EVC identifier of the selected EVC.

Looking back at FIG. 7A, there are two subnets, S1 and S2, with the lowest S entropy in ND1's expanded MSEI table. When multiple subnets are equally constrained, the subnet identifiers can be unambiguously sorted (e.g., numerically, alphabetically, or as otherwise appropriate given the format of the subnet identifiers), such that one subnet can be identified as being lower or higher (or before or after, or lesser or greater, and so on) relative to another subnet. EVC identifiers can be sorted in a similarly appropriate manner. Each subnet assignment module within each node is configured to sort subnet and EVC identifiers in the same manner. Accordingly, these identifiers can be used as tiebreakers when multiple subnets are equally constrained.

In this example, nodes are configured to prioritize selection of the lowest subnets and the lowest EVCs. However, it is noted that other selection techniques can be used in other embodiments. In this example, since S1 and S2 are equally constrained (as indicated by each of these subnets having an S Entropy of two (2)), ND1 selects the lowest subnet identifier, S1. ND1 then selects the EVC that satisfies subnet S1's requirements and that also has the lowest E entropy. As shown in FIG. 7A, EVCs EVC1 and EVC4 both satisfy S1's requirements and both have the same E entropy (four (4)). Accordingly, ND1 can select the lowest EVC (EVC1). ND1 sends a message (as indicated in FIG. 8) on EVC1 to identify that ND1 is proposing to assign S1 to EVC1. This message indicates that the S entropy of S1 is two (2).

As shown in FIG. 8, ND2 sends a similar message that proposes assigning S2 (also having an S entropy of 2) to EVC1. FIG. 7B shows ND2's expanded MSEI table, which indicates that S2 has the lowest S entropy (of the subnets of interest to ND2). Both of the two EVCs, EVC1 and EVC4, that satisfy S2's requirements have the same E entropy (four (4)), and thus ND2 selects the lowest EVC, EVC1.

As shown in FIG. 8, node ND3 sends a message proposing assignment of S2 to EVC1 and indicating that the S entropy associated with S2 is two (2). FIG. 7C shows that subnet S2 has the lowest S entropy of the subnets of interest in ND3's expanded MSEI table, and that both EVC1 and EVC4 can satisfy S2's requirements. Since EVC1 and EVC4 have the same entropy, ND3 selects the lowest EVC, EVC1, for inclusion in its message.

As shown in FIG. 8, ND4 sends a message that proposes assigning S1 to EVC1 and indicating that the S entropy of S1 is two (2). FIG. 7D shows ND4's expanded MSEI table, which indicates that S1 and S2 both have the lowest S entropy. Accordingly, ND4 selects the lowest subnet, S1. ND4's expanded MSEI table also indicates that EVC1 and EVC4 can satisfy S1's requirements. Since these EVCs have the same E entropy, ND4 selects the lowest EVC, EVC1.

In addition to sending the messages shown in FIG. 8, each node also receives messages containing potential assignment information from each other node. In this example, each node is proposing assigning a subnet to EVC1, and thus all of the messages are exchanged via EVC1. Accordingly, as shown in FIG. 8, each node will receive messages identifying both proposed assignments. Since the proposed assignments are not identical (some nodes want to assign S1 to EVC1 while other nodes want to assign S2 to EVC1), the nodes will all select the subnet having the lowest S entropy (as indicated by the exchanged messages). Here, both subnets at issue have the same S entropy, and thus the nodes will all select the lowest subnet for assignment to EVC1. Accordingly, all nodes for which S1 is a subnet of interest will assign S1 to EVC1. Any nodes that wanted to assign S2 to EVC1 will select not to make this assignment, based upon the received messages.

Once a subnet has been assigned to an EVC, both the subnet and the EVC to which the subnet was assigned are removed from all of the expanded MSEI tables. In some embodiments, these subnets and EVCs are effectively removed by replacing their entropy values with a value, such as "A", that indicates that the subnets and EVCs have been assigned. The nodes can then recalculate the S and E entropy values in the modified expanded MSEI tables. Based upon the new S and E entropy values, the nodes can then generate new proposed assignment messages and exchange those messages with other nodes. This process repeats until all nodes have assigned all subnets of interest.

In the example shown in FIG. 8, the nodes all reach a consensus state in which S1 is assigned to EVC1. Accordingly, each node will remove S1 and EVC1 from its expanded MSEI table and recalculate the S and E entropies. Removing S1 and EVC1 from the expanded MSEI table of FIG. 7A effectively removes the first row and the first column of the table. The recalculated S entropies will be one (1) for S2 (since EVC1 is no longer a candidate EVC for S2) and two (2) for S3 (since EVC1 is no longer a candidate EVC for S3). The recalculated E entropies will be one (1) for EVC2 and three (3) for EVC4 (since S1 is no longer a candidate for assignment to EVC4). Accordingly, in the next iteration, ND1 will send a message proposing assignment of S2 to EVC4, since S2 now has the lowest S entropy of the subnets still identified in ND1's expanded MSEI table.

Similarly, after the first iteration of assignment messages is exchanged, ND2 will remove the shadow row corresponding to S1 and the column corresponding to EVC1 from ND2's expanded MSEI table shown in FIG. 7B. ND2 will recalculate the S entropy values, such that S2 will have an S entropy of one (I) (since EVC1 is no longer a candidate EVC for S2) and S3 will have an S entropy of two (2) (again, since EVC1 is no longer a candidate EVC for S3). Thus, in the next round of assignment messages, ND2 will propose assigning S2 to EVC4, since S2 now has the lowest S entropy and EVC4 is the only EVC that satisfies S2's requirements.

Also, after the first iteration of assignment messages is exchanged, ND3 and ND4 will each update their MSEI table by removing the row corresponding to S1 and the column corresponding to EVC1. ND3 and ND4 can then recalculate the S entropy values and E entropy values for the updated table.

The updated MSEI tables and recalculated entropy values will in turn cause ND3 to propose assigning S2 to EVC2 with entropy 2 and ND4 to propose assigning S2 to EVC4 with entropy 1. After the second round of proposed subnet assignments have been exchanged, each node will assign S2 to EVC4.

The process continues until each subnet has been assigned to an EVC (at which point the process terminates) or until an error condition is detected, at which time an alarm condition can be flagged, and the process can wait for the error condition to be removed or the auto-configuration process to be halted.

In each round of assignment messages, the nodes' subnet assignments modules can implement a synchronization technique. For example, the same technique (e.g., soak times used to verify that CIVs have been received from all interested nodes can also be used to verify that all appropriate proposed assignments have been received). Such synchronization techniques can involve, for example, the use of a polling sequence, soak time, or the receipt of a minimum number of messages.

If, during the assignment process, any subnet ends up with an S entropy of zero (0), it means that there is no EVC that can satisfy the requirements of this subnet. Accordingly, if a node's subnet assignment module detects an S entropy of an unassigned subnet that equals zero, that subnet assignment module will signal an error condition (e.g., by logging the error, causing a instant message, text message, email, or the like to be sent to an administrator, causing an error indicator to light up, displaying an error message on a display screen, and/or any other desired form of reporting errors).

In certain circumstances, it is possible to simplify the technique shown in FIGS. 4A-8. For example, situations can arise in which it is not necessary for each node to transmit CIVs for all EVCs. Similarly, situations can arise in which it is not necessary for all nodes to perform the synchronization technique to confirm assignments described above.

One situation in which the above technique can be simplified arises when (1) each EVC only connects two nodes and (2) each EVC connects a different pair of nodes (i.e., when the EVCs are not parallel with each other). In this topology, the resulting S entropies in each node's SEI table will each equal one, and there will only be one cell per subnet-specific row of the MSEI table having a value of one (1). Similarly, all E entropies will equal one (1). The subnet assignment modules within each node can be configured to detect this situation and to assign subnets to EVCs without exchanging CIVs or proposed assignments with other nodes. In other words, when this situation is detected, a subnet assignment module can proceed without exchanging CIVs (and thus the expanded MSEI table will have the same subnet-specific rows as the original MSEI table), and can similarly proceed to making subnet assignments based upon that expanded MSEI table without first exchanging information about potential assignments with the other nodes.

Another situation in which the above technique can be simplified arises when each EVC connects only two nodes but multiple EVCs connect the same pair of nodes (EVCs that connect the same pair of nodes can be described as parallel EVCs). In this example, all parallel EVCs will have identical corresponding cells in each node's SEI table. These cells will identify both the local node (i.e., the node that is generating the SEI table) and the remote node that is coupled to the local node by the corresponding EVC. No other nodes will be identified. In such situations, the nodes coupled by those EVCs can each be configured to use the same algorithm when assigning subnets to EVCs (e.g., by assigning the lowest subnet to the lowest EVC that satisfies the lowest subnet's requirements prior to assigning other subnets). Accordingly, upon detecting identical entries, which only identify two nodes, in all cells of the SEI table that correspond to multiple EVCs, a subnet assignment module can proceed to assign subnets to these EVCs without exchanging CIVs on the EVCs and without exchanging proposed assignment information. The subnet assignment module can then mark the assigned subnets and EVCs as having been assigned (or remove such subnets and EVCs from the MSEI and expanded MSEI tables).

Many topologies will include a mix of EVCs that couple pairs of nodes (e.g., such as point-to-point EVCs) and EVCs that couple more than two nodes. After transmitting and receiving the initial advertisements, each node will be able to construct its SEI Table. By examining its SEI Table, each node will be able to determine which EVCs only couple a pair of nodes. In particular, if only one remote node identifier is included in the column corresponding to an EVC, the node's subnet assignment module can identify that EVC as an EVC that only couples a pair of nodes. There will only be one subnet that can be assigned to each such EVC. Accordingly, each node can make these assignments unilaterally and remove the corresponding rows and columns from the MSEI table (or mark such rows and columns as having already been assigned). Thus, there is no need to exchange CIV or potential assignment information with other nodes for these EVCs.

Figure 9:
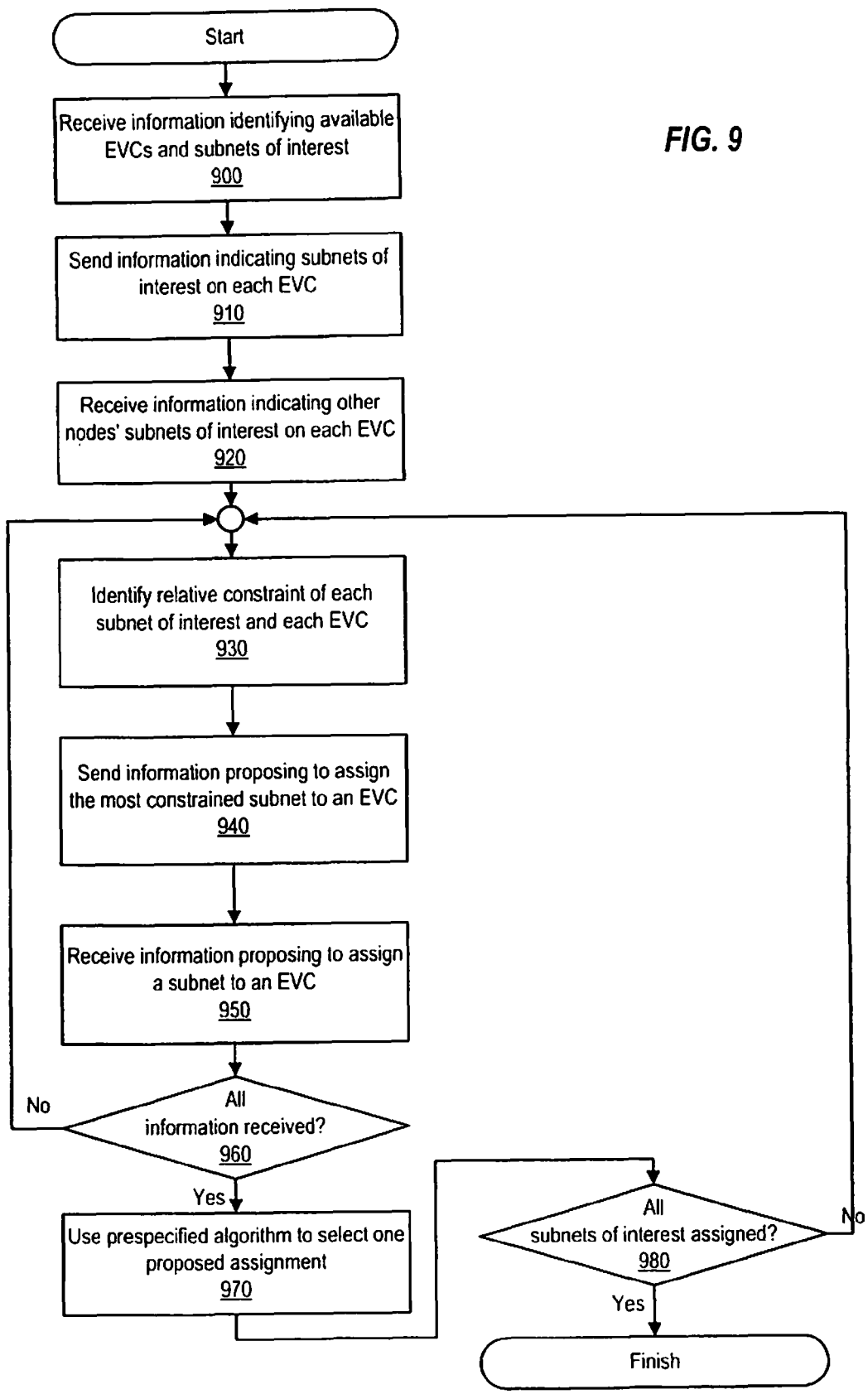
FIG. 9 is a flowchart of a method of automatically assigning an IP subnet to an EVC, according to one embodiment of the present invention.

FIG. 9 is a flowchart of a method of automatically assigning one or more IP subnets to one or more EVCs. This method can be performed by a subnet assignment module such as the one shown in FIG. 3.

The method begins when the subnet assignment module receives information identifying the available EVCs and the subnets of interest, as shown at 900. The subnets of interest can be identified when an administrator configures those subnets on the node that includes the subnet assignment module. The available EVCs can also be manually configured; however, in many embodiments, an automatic discovery protocol such as E-LMI can be used to obtain this information automatically.

In some embodiments, prior to proceeding with this method, the subnet assignment module can check for errors. For example, if there are more subnets to be assigned than there are EVCs available to the device with the subnet assignment module, an error should be signaled. The subnet assignment module can count the number of subnets to be assigned as well as the number of active EVCs. If the number of subnets of interest is greater than the number of available EVCs, an error condition must be declared.

At 910, the subnet assignment module sends information identifying the subnets of interest via each available EVC (or some other communication channel). The subnet assignment module receives similar information from each other node, as shown at 920.

The subnet assignment module should also detect an error condition if all of the nodes that are interested in the same subnet are not associated by at least one common EVC, and thus the subnet assignment module can check the information received at 920 to determine whether this situation has occurred.

Based upon the exchanged information, the subnet assignment module identifies the relative constraint of each subnet of interest and each available EVC, as shown at 930. In some embodiments, operation 930 is performed by generating all or some of: an SEI table, an MSEI table, one or more CIVs, and an expanded MSEI table.

The subnet assignment module then sends information identifying a proposed assignment that assigns the most constrained subnet to an EVC, as shown at 940. This information is sent via the EVC identified in the proposed assignment (or some other appropriate communication channel). As described above, there may be situations in which several subnets are equally constrained, and thus a prespecified algorithm (such as selecting the lowest subnet) can be used to select the most constrained subnet. Similarly, if there are multiple EVCs that are candidates to be assigned to the most constrained subnet, a prespecified algorithm can be used to select the EVC for inclusion in the proposed assignment.

The subnet assignment module receives similar information proposing an assignment from all of the other nodes, as shown at 950. The other nodes can propose different assignments than the assignment proposed by the subnet assignment module at 940. Once all of the other nodes' proposed assignments have been received, as determined at 960, the subnet assignment module can use a prespecified algorithm to select one of the proposed assignments, as shown at 970. If the selected assignment involves a subnet of interest to the subnet assignment module, the subnet assignment module will make the selected assignment. Once a subnet of interest has been assigned to an EVC, the subnet assignment module that made the assignment can use ARP to obtain the IP address to MAC address binding of remote nodes coupled by that EVC.

After the assignment has been made at 970, the subnet assignment module can repeat operations 930-370 until all of the subnets of interest have been assigned, as determined at 980. Each time these operations are repeated, the subnet assignment module can recalculate the relative constraint of each subnet and each EVC. The recalculated relative constraints take into account any increased constraints that resulted from a prior assignment of a subnet to an EVC.

Figure 10:
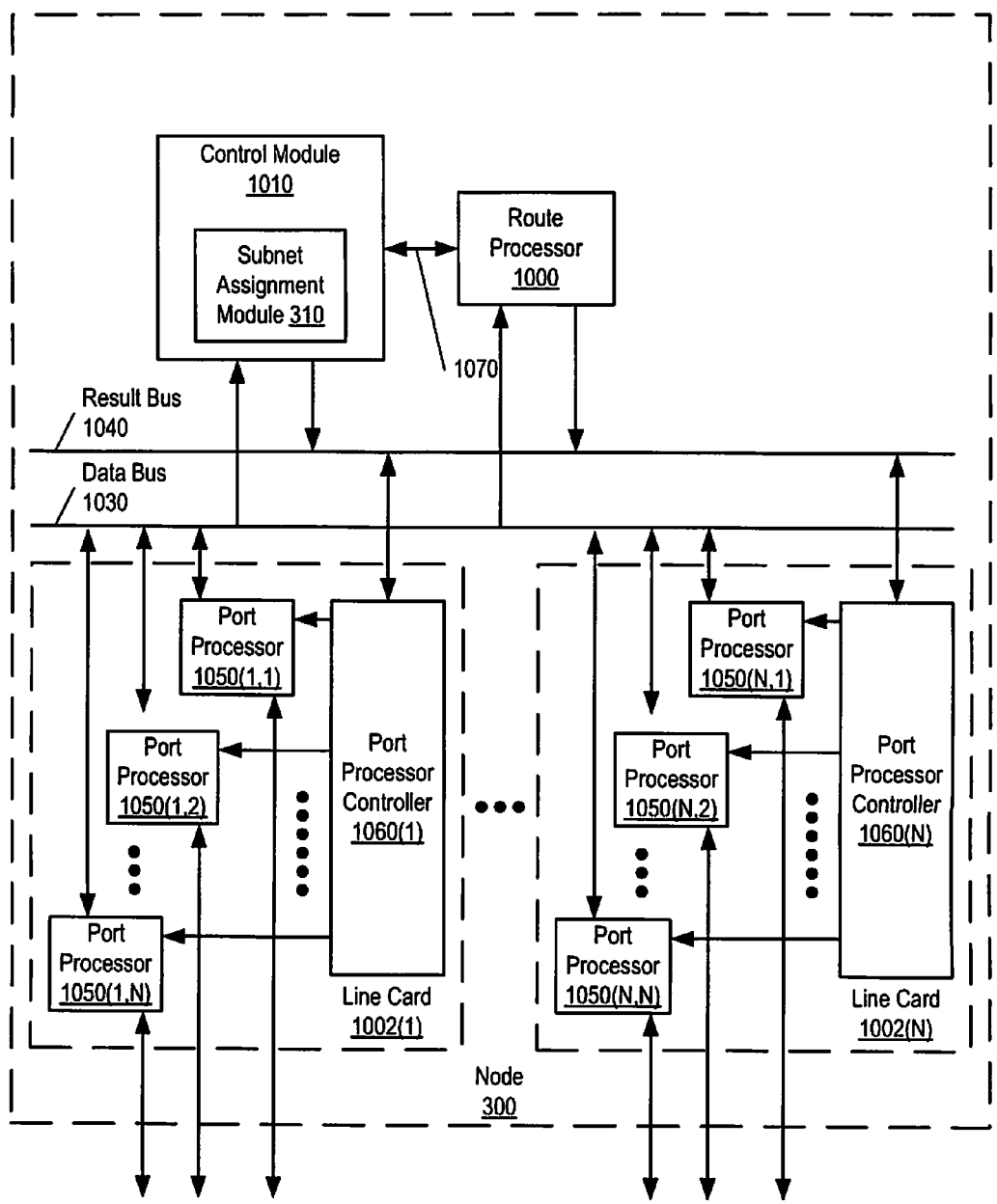
FIG. 10 is a block diagram of a node that is configured to automatically assign an IP subnet to an EVC, according to one embodiment of the present invention.

FIG. 10 is a block diagram of a node that is configured to automatically assign one or more IP subnets to one or more EVCs. FIG. 10 illustrates a node 300 (e.g., one of nodes ND1-ND4 of FIG. 2 or node 300 of FIG. 3). In this depiction, node 300 includes a number of line cards (line cards 1002(1)-1002(N)) that are communicatively coupled to a control module 1010 (which can include subnet assignment module 310, as shown) and a route processor 1000 via a data bus 1030 and a result bus 1040. Line cards 1002(1)-(N) include a number of port processors 1050(1,1)-1050(N,N) which are controlled by port processor controllers 1060(1)-1060(N). It will also be noted that control module 1010 and route processor 1000 are not only coupled to one another via data bus 1030 and result bus 1040, but are also communicatively coupled to one another by a communications link 1070. It is noted that in alternative embodiments, each line card can include its own forwarding engine.

When a message (e.g., an E-LMI message or a message containing subnet assignment information generated by another node) is received, the message is identified and analyzed by a node 300 in the following manner, according to embodiments of the present invention. Upon receipt, a message (or some or all of its control information) is sent from one of the port processors 1050(1,1)-1050(N,N) at which the message was received to one or more of those devices coupled to data bus 1030 (e.g., others of port processors 1050(1,1)-1050(N,N), a forwarding engine, and/or route processor 1000). Handling of the message can be determined, for example, by control module 1010. For example, control module 1010 may determine that the message should be processed by subnet assignment module 310.

Figure 11:
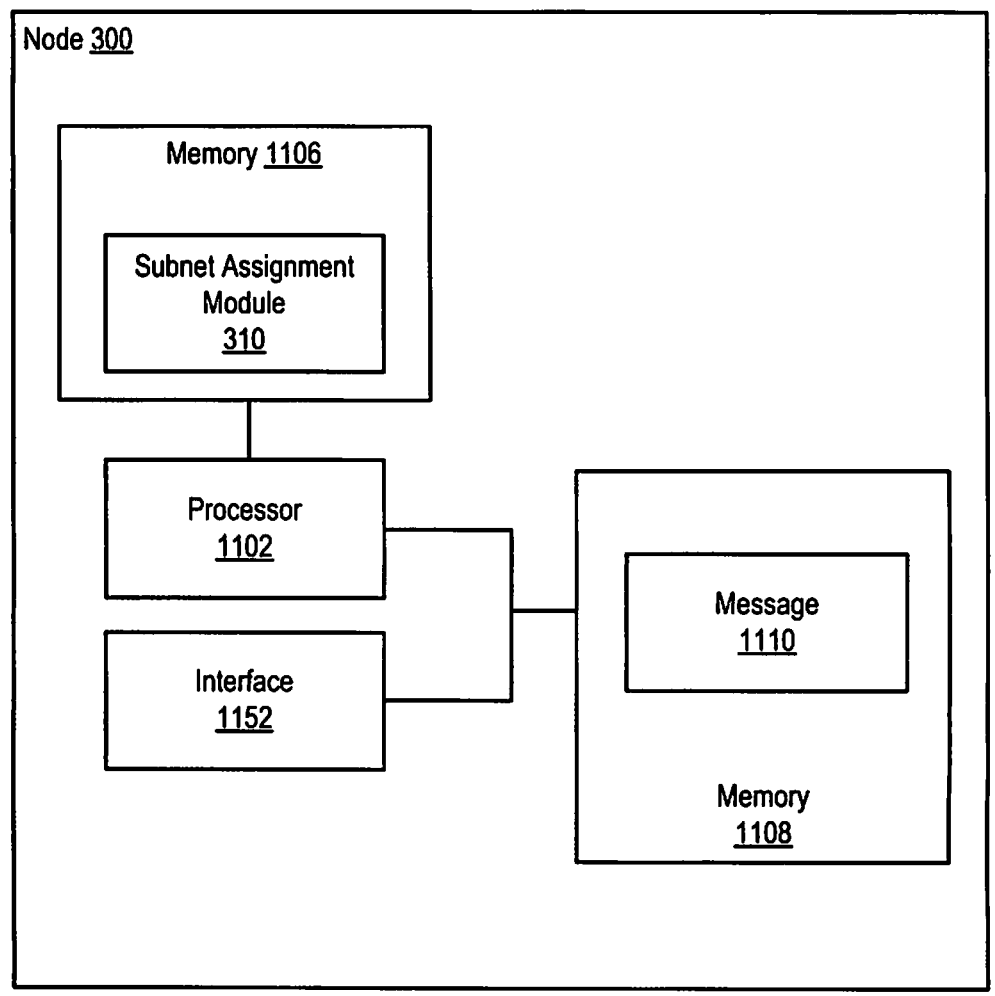
FIG. 11 is another block diagram of a node that is configured to automatically assign an IP subnet to an EVC, according to one embodiment of the present invention.

FIG. 11 is another block diagram of a node that is configured to automatically assign an IP subnet to an EVC. FIG. 11 illustrates how at least a portion of subnet assignment module 310 can be implemented in software. FIG. 11 shows a node 300, which is a device that can process IP information (e.g., a router, server, switch, or bridge, or the like, that has appropriate IP processing modules). As illustrated, node 300 includes one or more processors 1102 (e.g., microprocessors, PLDs (Programmable Logic Devices), or ASICs (Application Specific Integrated Circuits)) configured to execute program instructions stored in memories 1106 and/or 1108. Memories 1106 and 1108 can include various types of RAM (Random Access Memory), ROM (Read Only Memory), Flash memory, MEMS (Micro Electro-Mechanical Systems) memory, and the like. Node 300 also includes one or more interfaces 1152 (e.g., one or more hardware ports or other network interfaces that can be linked to other network devices, hosts, servers, storage devices, or the like). Processor 1102, interface 1152, and memories 1106 and 1108 are coupled to send and receive data and control signals by one or more buses or other interconnects.

In this example, program instructions executable to implement subnet assignment module 310 are stored in memory 1106. A message 1110 that has been received via interface 1152 can be stored in memory 1108 for processing by subnet assignment module 310. Such a message can be an E-LMI message or a message used to exchange subnet assignment information with other subnet assignment modules.

It is noted that the program instructions and/or data executable to implement subnet assignment module 310 can be stored on various computer readable media such as a memory (e.g., RAM (Random Access Memory)). In some embodiments, such software is stored on a computer readable medium such as a CD (Compact Disc), DVD (Digital Versatile Disc), hard disk, optical disk, tape device, floppy disk, and the like). In order be executed, the software is loaded into memory from another computer readable medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present invention has been described with respect to specific embodiments thereof, various changes and modifications may be suggested to one skilled in the art. It is intended such changes and modifications fall within the scope of the appended claims.

What is claimed is:

1. A method comprising:

receiving information identifying a plurality of virtual connections (VCs) available within a network, wherein at least one of the virtual connections is a point-to-multipoint virtual connection or a multipoint-to-multipoint virtual connection;

identifying a set of one or more nodes that are configured with one of a plurality of Internet Protocol (IP) subnets and that have access to one of the VCs;

assigning the one of the IP subnets to the one of the VCs, wherein the assigning comprises assigning a most constrained IP subnet to the one of the VCs, in response to receiving information indicating one or more proposed assignments from one or more other nodes; and verifying that each of the one or more other nodes is prepared to assign the most constrained IP subnet to the VC, prior to the assigning, wherein the receiving, the identifying, the verifying, and the assigning are performed by a node coupled to the network.

2. The method of claim 1, further comprising:

sending information comprising a node identifier and a list of one or more of the IP subnets, wherein the node identifier identifies the node and the list identifies IP subnets configured on the node.

3. The method of claim 2, further comprising:

receiving information identifying a sending node and a list of one or more of the IP subnets configured on the sending node, wherein the identifying the set of one or more nodes is based upon the information sent as well as the information received.

4. The method of claim 1, wherein the identifying the set of one or more nodes comprises generating a local table identifying which of a plurality of nodes are configured with each of the IP subnets as well as which of the plurality of nodes can communicate via each of the VCs, wherein all of the VCs identified in the table are available to the node.

5. The method of claim 1, further comprising:

sending information indicating a proposed assignment of a most constrained one of the IP subnets to a VC that satisfies requirements of the most constrained one of the IP subnets.

6. The method of claim 1, further comprising:

receiving information indicating a proposed assignment of a most constrained one of the IP subnets to a VC that satisfies requirements of the most constrained one of the IP subnets.

7. The method of claim 1, wherein the network is a metro Ethernet network, and wherein the VCs are Ethernet virtual connections.

8. A system comprising:

a node configured to be coupled to a network, the node comprising:

an interface configured to receive information identifying a plurality of virtual connections (VCs) available within the network, wherein at least one of the virtual connections is a point-to-multipoint virtual connection or a multipoint-to-multipoint virtual connection; and a subnet assignment module coupled to the interface, wherein the subnet assignment module is configured to:

identify a set of one or more nodes that are configured with one of a plurality of Internet Protocol (IP) subnets and that have access to one of the VCs;

assign the one of the IP subnets to the one of the VCs, wherein assigning the one of the IP subnets comprises assigning a most constrained IP subnet to the one of the VCs, in response to receiving information indicating one or more proposed assignments from one or more other nodes; and verify that each of the one or more other nodes is prepared to assign the most constrained IP subnet to the VC, prior to the assigning.

9. The system of claim 8, wherein the subnet assignment module is further configured to send information, via the interface, comprising a node identifier and a list of one or more of the IP subnets, wherein the node identifier identifies the node and the list identifies IP subnets configured on the node.

10. The system of claim 9, wherein the interface is further configured to receive information identifying a sending node and a list of one or more of the IP subnets configured on the sending node, and wherein the subnet assignment module is configured to identify the set of one or more nodes based upon the information sent as well as the information received.

11. The system of claim 8, wherein the subnet assignment module is configured to generate a local table identifying which of a plurality of nodes are configured with each of the IP subnets as well as which of the plurality of nodes can communicate via each of the VCs.

12. The system of claim 8, wherein the subnet assignment module is further configured to send information, via the interface, indicating a proposed assignment of a most constrained one of the IP subnets to a VC that satisfies requirements of the most constrained one of the IP subnets.

13. The system of claim 8, wherein the network is a metro Ethernet network, and wherein the VCs are Ethernet virtual connections.

14. A system comprising:

a node configured to coupled to a network, the node comprising:

means for receiving information identifying a plurality of virtual connections (VCs) available within the network, wherein at least one of the virtual connections is a point-to-multipoint virtual connection or a multipoint-to-multipoint virtual connection;

means for identifying a set of one or more nodes that are configured with one of a plurality of Internet Protocol (IP) subnets and that have access to one of the VCs; and means for assigning the one of the IP subnets to the one of the VCs, wherein the assigning comprises assigning a most constrained IP subnet to the one of the VCs, in response to receiving information indicating one or more proposed assignments from one or more other nodes; and means for verifying that each of the one or more other nodes is prepared to assign the most constrained IP subnet to the VC, prior to the assigning.

15. The system of claim 14, wherein the network is a metro Ethernet network, and wherein the VCs are Ethernet virtual connections.

* * * * *

UNITED STATES PATENT AND TRADEMARK OFFICE
CERTIFICATE OF CORRECTION

PATENT NO.           : 8,667,095 B2                                    Page 1 of 1
APPLICATION NO.      : 11/937779
DATED                : March 4, 2014
INVENTOR(S)          : Robert W. Klessig and Cedric H. Druce It is certified that error appears in the above-identified patent and that said Letters Patent is hereby corrected as shown below:

In the claims

Column 25
Line 21, in Claim 1, replace: "the VC" by -- the one of the VCs --
Line 42, in Claim 4, insert: -- local -- immediately after "identified in the"

Column 26
Line 13, in Claim 8, replace: "VC" by -- one of the VCs --
Line 61, in Claim 14, replace: "the VC" by -- the one of the VCs --

Signed and Sealed this
Twelfth Day of April, 2016

Michelle K. Lee
*Director of the United States Patent and Trademark Office*